United States Patent
Wang et al.

(10) Patent No.: US 12,527,500 B2
(45) Date of Patent: Jan. 20, 2026

(54) KETONE LIMITING MEMBRANE AND DUAL LAYER MEMBRANE APPROACH FOR KETONE SENSING

(71) Applicant: Medtronic MiniMed, Inc., Northridge, CA (US)

(72) Inventors: Jenn-Hann L. Wang, Northridge, CA (US); Anna J. Miller, Woodland Hills, CA (US); Chi-En Lin, Encino, CA (US); Melissa Tsang, Los Angeles, CA (US); Akhil Srinivasan, Woodland Hills, CA (US); Quyen B. Ong, Arcadia, CA (US)

(73) Assignee: MEDTRONIC MINIMED, INC., Northridge, CA (US)

( * ) Notice: Subject to any disclaimer, the term of this patent is extended or adjusted under 35 U.S.C. 154(b) by 596 days.

(21) Appl. No.: 17/980,018

(22) Filed: Nov. 3, 2022

(65) Prior Publication Data
US 2023/0172497 A1 Jun. 8, 2023

Related U.S. Application Data

(60) Provisional application No. 63/285,226, filed on Dec. 2, 2021.

(51) Int. Cl.
| | | |
|---|---|---|
| A61B 5/145 | (2006.01) | |
| A61B 5/1486 | (2006.01) | |
| C12Q 1/00 | (2006.01) | |
| G01N 27/327 | (2006.01) | |

(52) U.S. Cl.
CPC ........ *A61B 5/14546* (2013.01); *A61B 5/1486* (2013.01); *C12Q 1/005* (2013.01); *G01N 27/327* (2013.01)

(58) Field of Classification Search
None
See application file for complete search history.

(56) References Cited

U.S. PATENT DOCUMENTS

| | | | |
|---|---|---|---|
| 4,755,173 | A | 7/1988 | Konopka et al. |
| 5,391,250 | A | 2/1995 | Cheney, II et al. |
| 5,485,408 | A | 1/1996 | Blomquist |
| 5,522,803 | A | 6/1996 | Teissen-Simony |
| 5,665,065 | A | 9/1997 | Colman et al. |
| 5,800,420 | A | 9/1998 | Gross et al. |

(Continued)

FOREIGN PATENT DOCUMENTS

| | | |
|---|---|---|
| EP | 2665827 A1 | 11/2013 |
| WO | 2021042033 A1 | 3/2021 |
| WO | 2022125537 A2 | 6/2022 |

OTHER PUBLICATIONS

Extended European Search Report dated Apr. 6, 2023 for EP Application No. 22209660.4.

(Continued)

*Primary Examiner* — J. Christopher Ball
(74) *Attorney, Agent, or Firm* — GATES & COOPER LLP

(57) ABSTRACT

The invention provides amperometric analyte sensor systems comprising one or more electrodes designed to monitor in vivo levels of 3-hydroxybutyrate (and optionally glucose as well) in order to facilitate the management of diabetic ketoacidosis. The invention further includes dual layer membrane compositions, elements and methods useful with such amperometric analyte sensor systems.

14 Claims, 31 Drawing Sheets

(56) References Cited

U.S. PATENT DOCUMENTS

| | | |
|---|---|---|
| 5,807,375 A | 9/1998 | Gross et al. |
| 5,925,021 A | 7/1999 | Castellano et al. |
| 5,954,643 A | 9/1999 | Van Antwerp et al. |
| 6,017,328 A | 1/2000 | Fischell et al. |
| 6,186,982 B1 | 2/2001 | Gross et al. |
| 6,246,992 B1 | 6/2001 | Brown |
| 6,248,067 B1 | 6/2001 | Causey, III et al. |
| 6,248,093 B1 | 6/2001 | Moberg |
| 6,355,021 B1 | 3/2002 | Nielsen et al. |
| 6,379,301 B1 | 4/2002 | Worthington et al. |
| 6,544,212 B2 | 4/2003 | Galley et al. |
| 6,558,351 B1 | 5/2003 | Steil et al. |
| 6,591,876 B2 | 7/2003 | Safabash |
| 6,641,533 B2 | 11/2003 | Causey, III et al. |
| 6,736,797 B1 | 5/2004 | Larsen et al. |
| 6,749,587 B2 | 6/2004 | Flaherty |
| 6,766,183 B2 | 7/2004 | Walsh et al. |
| 6,801,420 B2 | 10/2004 | Talbot et al. |
| 6,804,544 B2 | 10/2004 | Van Antwerp et al. |
| 7,003,336 B2 | 2/2006 | Holker et al. |
| 7,029,444 B2 | 4/2006 | Shin et al. |
| 7,066,909 B1 | 6/2006 | Peter et al. |
| 7,137,964 B2 | 11/2006 | Flaherty |
| 7,303,549 B2 | 12/2007 | Flaherty et al. |
| 7,399,277 B2 | 7/2008 | Saidara et al. |
| 7,442,186 B2 | 10/2008 | Blomquist |
| 7,602,310 B2 | 10/2009 | Mann et al. |
| 7,647,237 B2 | 1/2010 | Malave et al. |
| 7,699,807 B2 | 4/2010 | Faust et al. |
| 7,727,148 B2 | 6/2010 | Talbot et al. |
| 7,785,313 B2 | 8/2010 | Mastrototaro |
| 7,806,886 B2 | 10/2010 | Kanderian, Jr. et al. |
| 7,819,843 B2 | 10/2010 | Mann et al. |
| 7,828,764 B2 | 11/2010 | Moberg et al. |
| 7,879,010 B2 | 2/2011 | Hunn et al. |
| 7,890,295 B2 | 2/2011 | Shin et al. |
| 7,892,206 B2 | 2/2011 | Moberg et al. |
| 7,892,748 B2 | 2/2011 | Norrild et al. |
| 7,901,394 B2 | 3/2011 | Ireland et al. |
| 7,942,844 B2 | 5/2011 | Moberg et al. |
| 7,946,985 B2 | 5/2011 | Mastrototaro et al. |
| 7,955,305 B2 | 6/2011 | Moberg et al. |
| 7,963,954 B2 | 6/2011 | Kavazov |
| 7,977,112 B2 | 7/2011 | Burke et al. |
| 7,979,259 B2 | 7/2011 | Brown |
| 7,985,330 B2 | 7/2011 | Wang et al. |
| 8,024,201 B2 | 9/2011 | Brown |
| 8,100,852 B2 | 1/2012 | Moberg et al. |
| 8,114,268 B2 | 2/2012 | Wang et al. |
| 8,114,269 B2 | 2/2012 | Cooper et al. |
| 8,137,314 B2 | 3/2012 | Mounce et al. |
| 8,181,849 B2 | 5/2012 | Bazargan et al. |
| 8,182,462 B2 | 5/2012 | Istoc et al. |
| 8,192,395 B2 | 6/2012 | Estes et al. |
| 8,195,265 B2 | 6/2012 | Goode, Jr. et al. |
| 8,202,250 B2 | 6/2012 | Stutz, Jr. |
| 8,207,859 B2 | 6/2012 | Enegren et al. |
| 8,226,615 B2 | 7/2012 | Bikovsky |
| 8,257,259 B2 | 9/2012 | Brauker et al. |
| 8,267,921 B2 | 9/2012 | Yodfat et al. |
| 8,275,437 B2 | 9/2012 | Brauker et al. |
| 8,277,415 B2 | 10/2012 | Mounce et al. |
| 8,292,849 B2 | 10/2012 | Bobroff et al. |
| 8,298,172 B2 | 10/2012 | Nielsen et al. |
| 8,303,572 B2 | 11/2012 | Adair et al. |
| 8,305,580 B2 | 11/2012 | Aasmul |
| 8,308,679 B2 | 11/2012 | Hanson et al. |
| 8,313,433 B2 | 11/2012 | Cohen et al. |
| 8,318,443 B2 | 11/2012 | Norrild et al. |
| 8,323,250 B2 | 12/2012 | Chong et al. |
| 8,343,092 B2 | 1/2013 | Rush et al. |
| 8,352,011 B2 | 1/2013 | Van Antwerp et al. |
| 8,353,829 B2 | 1/2013 | Say et al. |
| 2007/0123819 A1 | 5/2007 | Mernoe et al. |
| 2010/0160861 A1 | 6/2010 | Causey, III et al. |
| 2020/0237275 A1 | 7/2020 | Feldman et al. |
| 2020/0237276 A1 | 7/2020 | Oja et al. |
| 2022/0133190 A1 | 5/2022 | Ong |
| 2022/0186278 A1* | 6/2022 | Liu ............... A61B 5/14532 |
| 2022/0338768 A1 | 10/2022 | Tsang et al. |

OTHER PUBLICATIONS

Teymourian Hazhir et al: "Microneedle-Based Detection of Ketone Bodies along with Glucose and Lactate: Toward Real-Time Continuous Interstitial Fluid Monitoring of Diabetic Ketosis and Ketoacidosis", Analytical Chemistry, vol. 92, No. 2, Dec. 24, 2019 (Dec. 24, 2019), pp. 2291-2300.

Extended European Search Report dated Mar. 20, 2024 for European Application No. 23205590.5.

Hatada et al: "Development of a glucose sensor employing quick and easy modification method with mediator for altering electron acceptor preference", Bioelectrochemistry,vol. 121, Jun. 1, 2018 (Jun. 1, 2018), pp. 185-190.

\* cited by examiner

PRIOR ART

- Electrograft phenylalanine
- Use as backbone for coupling to TBO & NAD
- Possibility for two different binding conformations
- Incorporation of boronic acid moiety into membrane possible through vinyl boronic acid

FIG. 10A: Ketone sensor
Ketone sensor chemical reactions
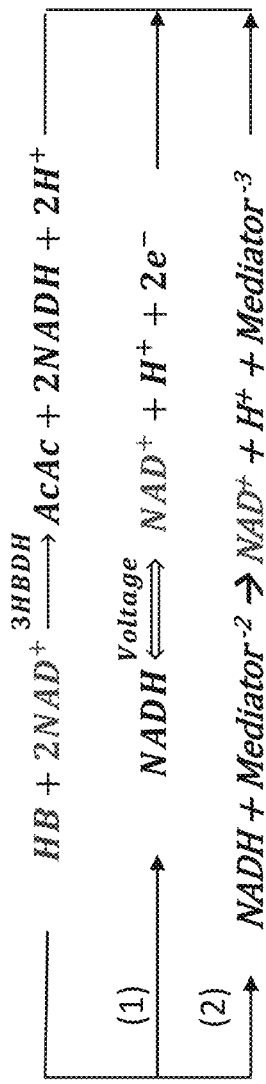
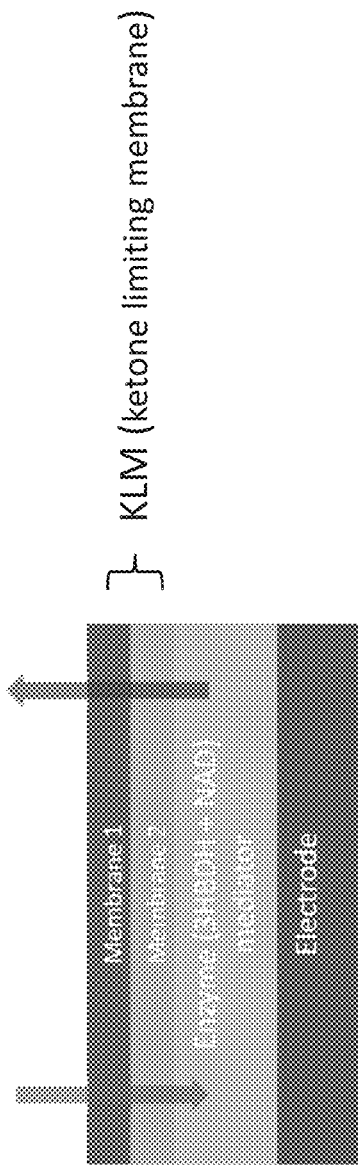

FIG. 10B: Permeability of a 2-layer membrane
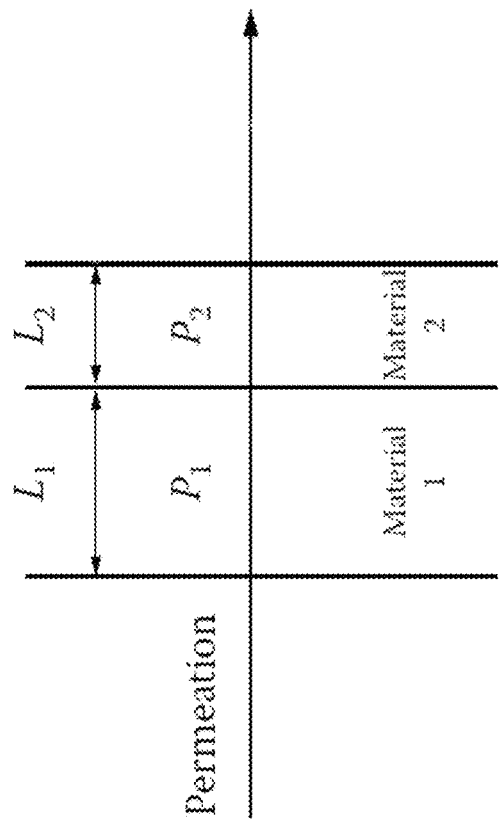
From Fick's Law:
$$\frac{L_{tot}}{P_{tot}} = \frac{L_1}{P_1} + \frac{L_2}{P_2}$$
$P_{tot}$ = The overall permeability of the multilayer membrane
$L_{tot}$ = Total thickness of the film

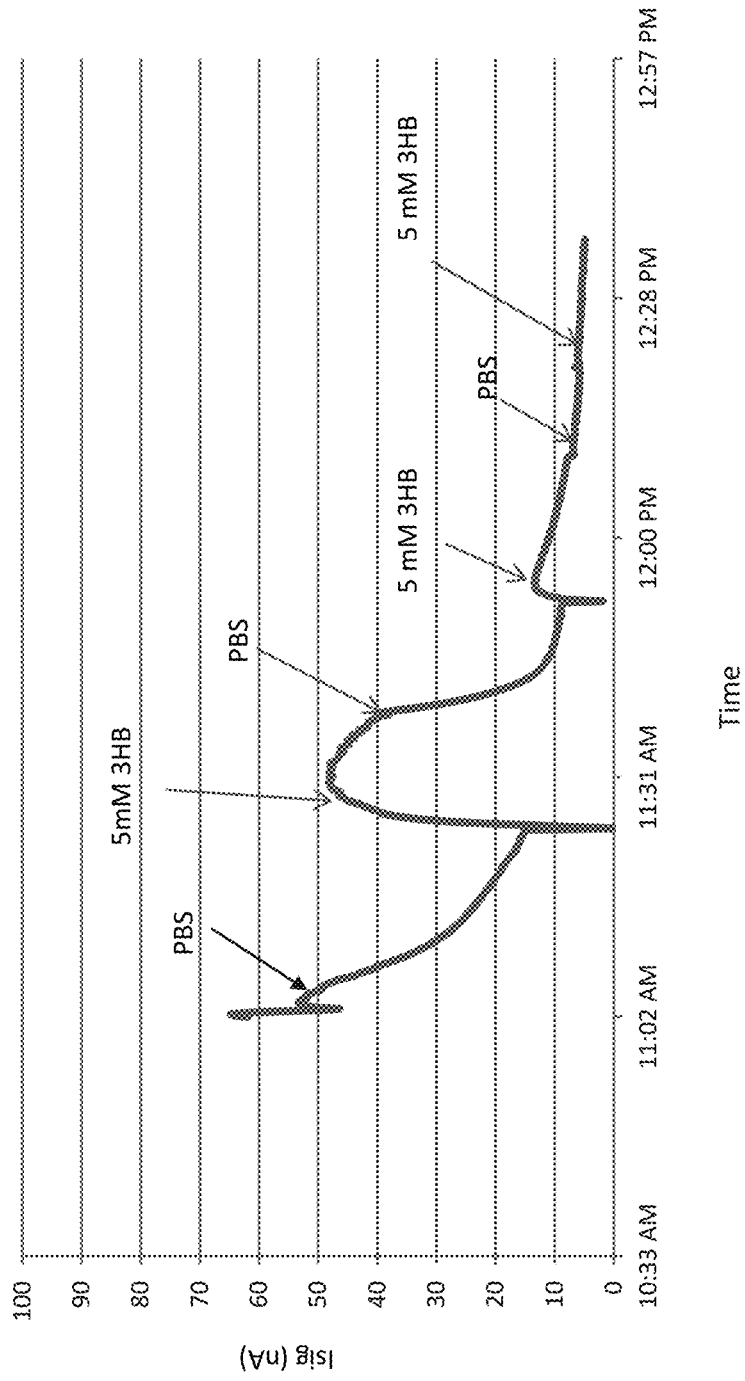
FIG. 10C: Ketone Sensor #5319-5 (40 um PCU-GLM)

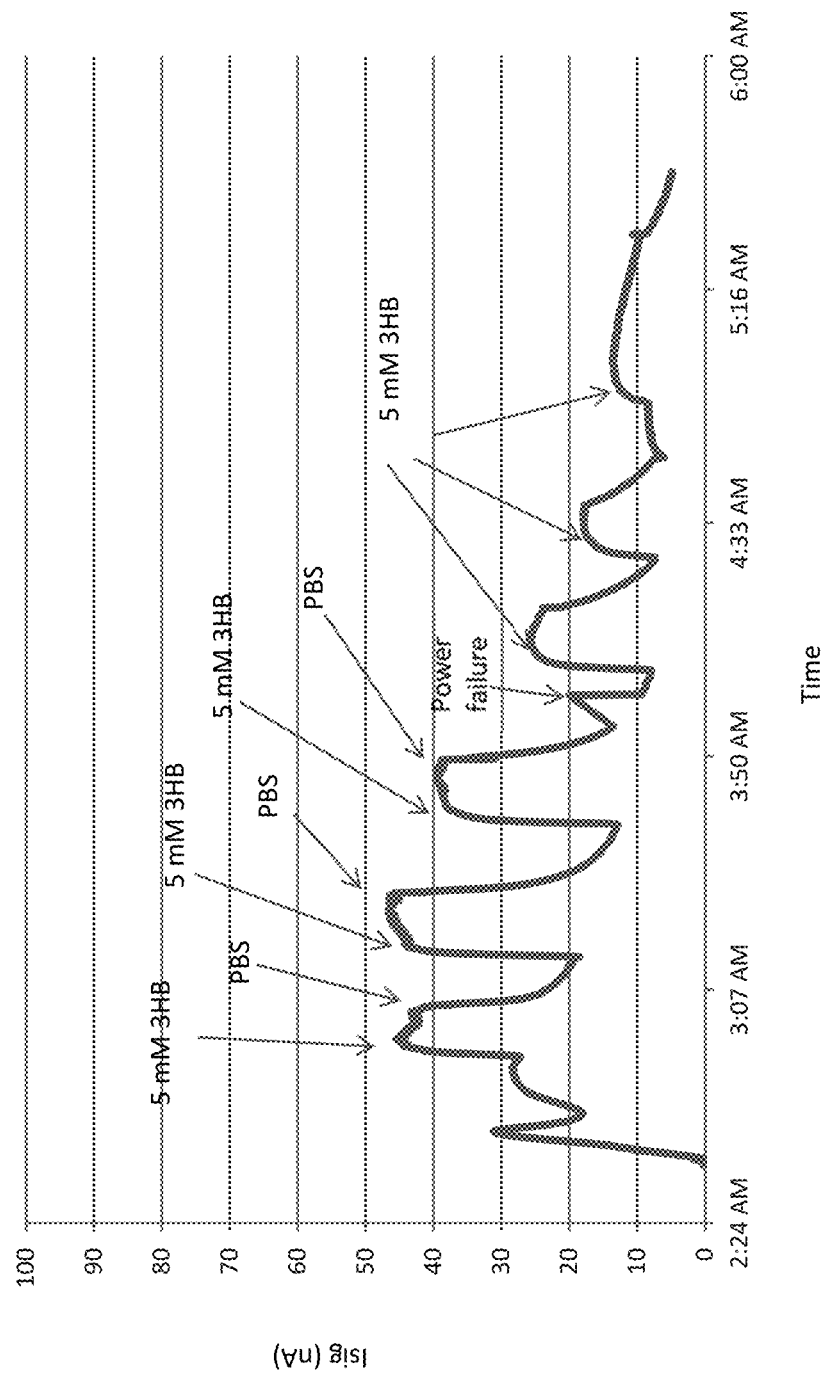

KETONE LIMITING MEMBRANE AND DUAL LAYER MEMBRANE APPROACH FOR KETONE SENSING

CROSS-REFERENCE TO RELATED APPLICATIONS

This application claims priority under Section 120 from U.S. Patent Application Ser. No. 63/285,226, filed Dec. 2, 2021, the contents of which are incorporated herein by reference.

TECHNICAL FIELD

The present invention relates to elements and methods useful with analyte sensor systems, such as those used in the management of diabetes.

BACKGROUND OF THE INVENTION

Sensors are used to monitor a wide variety of compounds in various environments, including in vivo analytes. The quantitative determination of analytes in humans and mammals is of great importance in the diagnoses and maintenance of a number of pathological conditions. Illustrative analytes that are commonly monitored in a large number of individuals include glucose, lactate, cholesterol, and bilirubin. The determination of glucose concentrations in body fluids is of particular importance to diabetic individuals, individuals who must frequently check glucose levels in their body fluids to regulate the glucose intake in their diets. The results of such tests can be crucial in determining what, if any, insulin and/or other medication need to be administered.

Analyte sensors typically include components that convert interactions with analytes into detectable signals that can be correlated with the concentrations of the analyte. For example, some glucose sensors use amperometric means to monitor glucose in vivo. Some amperometric glucose sensors incorporate electrodes coated with layers of materials such as glucose oxidase (GOx), an enzyme that catalyzes the reaction between glucose and oxygen to yield gluconic acid and hydrogen peroxide ($H_2O_2$). The $H_2O_2$ formed in this reaction alters an electrode current to form a detectable and measurable signal. Based on the signal, the concentration of glucose in the diabetic individual can then be measured.

For people with type 1 diabetes, hyperglycemia caused by insufficient insulin can lead to diabetic ketoacidosis (DKA). Diabetic ketoacidosis is a severe metabolic disease that often requires intensive treatment. Diagnosis of ketosis associated with DKA can be difficult due to variability in the metabolic state of DKA patients. Recognition of the clinical signs and definitive diagnosis are essential for proper treatment. However, in type 1 diabetes, hyperglycemia can also be caused by eating too much food, which requires treatment to lower blood sugar levels but which does not lead to DKA. The only way to determine between these two clinical phenomena is through ketone testing.

There are significant medical benefits from ketone testing in diabetic individuals. For example, with patients using insulin pumps, blood ketone testing can be used to identify interruptions in insulin flow faster and more accurately than even blood glucose monitoring and could thus help pump users prevent diabetic ketoacidosis (see, e.g. Orsini-Federici et al., Diabetes Technol Ther. 2006 February;8(1):67-75). Moreover, it has been shown that in sick day management using blood 3-hydroxybutyrate (3-OHB) compared with urine ketone monitoring reduces hospital visits in young people with type 1 diabetes (see, e.g. Laffel et al., Diabetic Medicine 23 (3), 278-284, 2006). Conventionally, ketones are measured by a fingerstick strip and meter methods. These methods are not designed to continuously monitor levels of 3-hydroxybutyrate in patients.

In view of the above, new systems and methods designed to continuously and monitor levels of 3-hydroxybutyrate as well as glucose in blood or the like (e.g. interstitial fluid) are desirable.

SUMMARY OF THE INVENTION

The invention disclosed herein has a number of embodiments which are designed for monitoring ketone levels in diabetic individuals. Embodiments of the invention can be used, for example, by diabetic individuals to identify interruptions in insulin delivery from their insulin pumps and help prevent diabetic ketoacidosis. Illustrative embodiments of the invention include amperometric analyte sensor systems having the constellations of elements disclosed herein. Typically, such 3-hydroxybutyrate sensing electrodes include a layer of an electroactive material; an enzyme layer comprising 3-hydroxybutyrate dehydrogenase enzyme in operable contact with the electroactive material; a nicotinamide adenine dinucleotide (NAD+/NADH) cofactor in operable contact with the 3-hydroxybutyrate dehydrogenase enzyme; and a mediator in operable contact with the nicotinamide adenine dinucleotide. This constellation of elements is coated by a 3-hydroxybutyrate modulating layer (a ketone limiting membrane) as disclosed herein, one which comprises a dual layer composition that modulates the diffusion of 3-hydroxybutyrate therethrough. In certain embodiments of the invention, the analyte modulating layer or another layer of material in the stack of sensor layers functions as a barrier layer that inhibits the diffusion of nicotinamide adenine dinucleotide out of the sensor.

Embodiments of the invention include D-3-hydroxybutyrate analyte sensor systems comprising a dual layer ketone limiting membrane disclosed herein. Such dual layer ketone limiting membranes are formed using compounds and/or using methods that provide such membranes with selected material properties, for example an ability to selectively modulate the diffusion of D-3-hydroxybutyrate and/or nicotinamide adenine dinucleotide therethrough. Typically such ketone limiting membranes comprise an inner membrane layer having a first permeability to D-3-hydroxybutyrate and a first permeability to nicotinamide adenine dinucleotide; and an outer membrane layer having a second permeability to D-3-hydroxybutyrate and a second permeability to nicotinamide adenine dinucleotide; wherein the inner membrane layer permeability to nicotinamide adenine dinucleotide is lower than the outer membrane layer permeability to nicotinamide adenine dinucleotide. For example, in certain embodiments of the invention, the inner membrane exhibits a perm-selectivity of 3HB acid to NADH of at least 50; and/or the outer membrane exhibits a perm-selectivity of 3HB acid to NADH of at least 1. In some embodiments of the invention, the inner membrane exhibits a 3HB permeability of at least 1.0E-09 cm2/sec; the inner membrane exhibits a NADH permeability not greater than 3.0E-09 cm2/sec; the outer membrane exhibits a 3HB permeability of at least 5.0E-09 cm2/sec; and/or the outer membrane exhibits a NADH permeability not greater than 5.0E-09 cm2/sec. Typically in embodiments of the invention, the inner membrane layer is from 0.1 to 5 microns in thickness, and/or the outer layer is from 2 to 50 microns in thickness.

In typical embodiments of the invention, the D-3-hydroxybutyrate analyte sensor system comprises additional elements as discussed below. For example, such embodiments of the invention can include a 3-hydroxybutyrate sensing electrode comprising a layer of an electroactive material, an enzyme layer comprising 3-hydroxybutyrate dehydrogenase enzyme in operable contact with the electroactive material, a nicotinamide adenine dinucleotide in operable contact with the 3-hydroxybutyrate dehydrogenase enzyme, and a mediator in operable contact with the nicotinamide adenine dinucleotide.

The dual layer ketone limiting membranes can be formed from a number of compounds having selected material properties. For example, in some embodiments of the invention, the inner membrane layer comprises cellulose acetate; and/or the outer membrane layer comprises a polyurea a JEFFAMINE 600, a polydimethylsiloxane, and/or 4,4'-Methylenebis (cyclohexyl isocyanate). In certain embodiments of the invention, the inner membrane layer comprises cellulose acetate; and/or the outer membrane layer comprises a polyurea-urethane, or a polycarbonate urea (PCU) glucose limiting membrane (GLM), which contains, for example a Jeffamine such as JEFFAMINE 600, a polydimethylsiloxane, a 4,4'-Methylenebis (cyclohexyl isocyanate), a 4,4'-Methylenebis (phenyl isocyanate), and/or polycarbonate diol and the like. See, e.g., U.S. Patent Application Publication No. 20170347933, the contents of which are incorporated by reference. In certain embodiments of the invention, the inner membrane layer comprises poly(ethylene-vinyl acetate), and/or the outer membrane layer comprises at least one of a polyurea (or a polycarbonate urea), a JEFFAMINE such as JEFFAMINE 600, a polydimethylsiloxane, and a 4,4'-Methylenebis (cyclohexyl isocyanate). In certain embodiments of the invention, the inner membrane layer comprises at least one of a poly(ethylene-vinyl acetate), and/or the outer membrane layer comprises at least one of a polyurea-urethane (or a PCU-GLM), a JEFFAMINE such as JEFFAMINE 600, a polydimethylsiloxane, a 4,4'-Methylenebis (cyclohexyl isocyanate), a 4,4'-Methylenebis (phenyl isocyanate), and a polycarbonate diol or the like.

Embodiments of the invention also include methods of making D-3-hydroxybutyrate analyte sensors having the membranes disclosed herein. Such methods typically comprise forming an inner membrane layer of the ketone limiting membrane from materials selected to exhibit a first permeability to D-3-hydroxybutyrate and a first permeability to nicotinamide adenine dinucleotide; and also forming an outer membrane layer of the ketone limiting membrane from materials selected to exhibit a second permeability to D-3-hydroxybutyrate and a second permeability to nicotinamide adenine dinucleotide. In such methods, the reagents and methods steps are designed so that the inner membrane layer permeability to nicotinamide adenine dinucleotide is lower than the outer membrane layer permeability to nicotinamide adenine dinucleotide. Such methods typically further comprise disposing the ketone limiting membrane on a D-3-hydroxybutyrate analyte sensor at a location selected so that D-3-hydroxybutyrate diffuses from an external environment through the ketone limiting membrane and to an electrode disposed within the D-3-hydroxybutyrate analyte sensor, wherein the electrode is coupled to a ketone sensing complex.

Typically in the methods of making a D-3-hydroxybutyrate analyte sensors, the inner membrane is formed to exhibit a perm-selectivity of 3HB acid to NADH of at least 50; and/or the outer membrane is formed to exhibit a perm-selectivity of 3HB acid to NADH of at least 1. In certain embodiments of these methods, the inner membrane is formed to exhibit a 3HB permeability of at least 1.0E-09 cm2/sec; the inner membrane is formed to exhibit a NADH permeability not greater than 3.0E-09 cm2/sec; the outer membrane is formed to exhibit a 3HB permeability of at least 5.0E-09 cm2/sec; and/or the outer membrane is formed to exhibit a NADH permeability not greater than 5.0E-09 cm2/sec. Optionally in these methods, the inner membrane layer is formed to be from 0.1 to 5 microns in thickness, and/or the outer layer is formed to be from 2 to 50 microns in thickness. In certain embodiments of these methods, the electrode is formed to comprise: a layer of an electroactive material; an enzyme layer comprising 3-hydroxybutyrate dehydrogenase enzyme in operable contact with the electroactive material; nicotinamide adenine dinucleotide in operable contact with the 3-hydroxybutyrate dehydrogenase enzyme; and a mediator in operable contact with the nicotinamide adenine dinucleotide.

Embodiments of the invention further include methods for estimating the concentrations of 3-hydroxybutyrate in vivo, the methods comprising disposing an amperometric analyte sensor system having a dual layer ketone limiting membrane disclosed herein into an in vivo environment of a subject, wherein the environment comprises 3-hydroxybutyrate; and estimating the concentration of 3-hydroxybutyrate; so that the concentrations of 3-hydroxybutyrate in vivo are estimated.

Other objects, features and advantages of the present invention will become apparent to those skilled in the art from the following detailed description. It is to be understood, however, that the detailed description and specific examples, while indicating some embodiments of the present invention are given by way of illustration and not limitation. Many changes and modifications within the scope of the present invention may be made without departing from the spirit thereof, and the invention includes all such modifications.

BRIEF DESCRIPTION OF THE DRAWINGS

FIG. 1A provides a schematic of a reaction between 3-hydroxybutyrate and a 3-hydroxybutyrate dehydrogenase enzyme (left panel) and a schematic of an illustrative 3-hydroxybutyrate electrode comprising a layered composition of materials including a polyimide base, polyimide insulation elements, gold and chrome electrode materials, a layer comprising 3-hydroxybutyrate dehydrogenase enzyme, NAD and other components, and a 3-hydroxybutyrate limiting membrane (right panel). FIG. 1B shows a sensor electrode configuration where a working electrode ("WE") electroactive material is coated with an enzyme layer (e.g., one comprising 3-hydroxybutyrate dehydrogenase enzyme), with this enzyme layer being coated with a layer of material comprising nicotinamide adenine dinucleotide ("NAD"), which is further coated with an analyte modulating layer ("KLM" for ketone limiting layer), with an adhesion promoting layer disposed between the NAD layer and the KLM layer. FIG. 1C shows a sensor electrode configuration where an electrode electroactive material is coated with a layer of material comprising nicotinamide adenine dinucleotide ("NAD"), which is further coated with an NAD entrapment layer/membrane (e.g. one that degrades over time), with this entrapment layer/membrane being coated with an enzyme layer (e.g. one comprising 3-hydroxybutyrate dehydrogenase enzyme), with this enzyme layer being coated with an analyte modulating layer ("KLM" for ketone limiting layer). FIG. 1D (PRIOR ART) shows a sensor electrode configuration 100 having a plurality of layered elements including a base layer 102, an electroactive material layer 104, an analyte sensing layer 110 (e.g. one comprising an enzyme such as 3-hydroxybutyrate dehydrogenase), a protein layer 116, an adhesion promoter layer 114 and an analyte modulating layer 112. FIG. 1E shows a sensor electrode configuration showing differences between the conventional multilayer sensor stacks shown and sensor stacks having a high density amine layer.

FIG. 2A shows data from SDS Gels, FIGS. 2B and 2C shows data from capillary electrophoresis of the 3HBD Bound/Eluted from a Ni-NTA Column; and FIG. 2D shows comparative data from a fluorescence assay of the activity of 3HBD enzymes from different organisms. FIG. 2B provides data showing that *Ralstonia pickettii* BDH3 is expressible in *E. coli*, makes a soluble product, and binds/elutes from Ni-NTA and is present as Monomer: 71.9%, Dimer 17.7%, and Trimer 3.4%. FIG. 2C provides data showing that *Pseudomonas fragi* BDH3 is expressible in *E. coli*, makes a soluble product, and binds/elutes from Ni-NTA. FIG. 2D provides data showing that *Pseudomonas* Tragi and *Ralstonia pickettii* BDH3 exhibit activity comparable to commercially available isoforms of 3HBD (i.e., *Pseudomonas Lemoignei* 3HBD).

As shown in FIG. 4, a potentiostat 300 may include an op amp 310 that is connected in an electrical circuit so as to have two inputs: Vset and Vmeasured. As shown, Vmeasured is the measured value of the voltage between a reference electrode and a working electrode. Vset, on the other hand, is the optimally desired voltage across the working and reference electrodes. The current between the counter and reference electrode is measured, creating a current measurement (isig) that is output from the potentiostat.

FIG. 6A shows schematics of nicotinamide adenine dinucleotide ("NAD") immobilization strategies using PEG linkers (left panel), electrografted 3-aminophenylboronic acids (APB) (middle panel) and avidin/biotin (right panel). FIG. 6B shows schematics of nicotinamide adenine dinucleotide ("NAD") immobilization strategies using NAD entrapped within microspheres that are coupled to the electrode via PEG linkers (left panel) or entrapped within the analyte sensing enzyme layer (right panel). FIG. 6C shows schematics of a nicotinamide adenine dinucleotide ("NAD") regeneration strategy using diaphorase in the enzyme layer.

FIG. 7A shows data from studies of NAD leaching in configurations where HMDSO is used as an entrapment/barrier membrane layer. FIG. 7B shows data from studies of NAD leaching in configurations where Paralyne is used as an entrapment/barrier membrane layer.

FIG. 8A shows the NAD+ structure, one having the N6-amine, phosphate backbone and cis diol moieties as immobilization sites. FIG. 8B shows NAD binding orientations on a boronate linker. In this schematic, methionine (Met) is directly bound to the electrode, carboxyphenylboronic acid (CBA) and toluidine blue O (TBO) mediator are bound to Met through amide bonds, and NAD is bound to CBA through its cis-diols. FIG. 8C shows a scheme for formation of cross-linked integrated cysteine-toluidine blue O-phenylboronic acid-NAD(P)+ functionalized gold electrode (see, e.g., Hassler et al., Biosensors and Bioelectronics 21 (2006) 2146-2154).

FIG. 9A shows data from studies of 3-hydroxybutyrate sensing electrodes sensing various concentrations of 3-hydroxybutyrate. FIGS. 9B-9G show data from studies 3-hydroxybutyrate sensing electrodes comprising affinity bound NAD.

FIGS. 10A-10D show schematics and data from studies illustrating the functionality of embodiments of the invention. FIG. 10A shows a sensor electrode configuration where a working electrode ("WE") electroactive material is coated with an enzyme layer (e.g., one comprising 3-hydroxybutyrate dehydrogenase enzyme), with this enzyme layer being coated with a dual membrane/layer ketone limiting membrane. FIG. 10B shows a schematic pertaining to permeability and Fick's law. FIGS. 10C and 10D show data from studies illustrating the functionality of embodiments of the invention.

DETAILED DESCRIPTION OF THE INVENTION

Figure 1A:
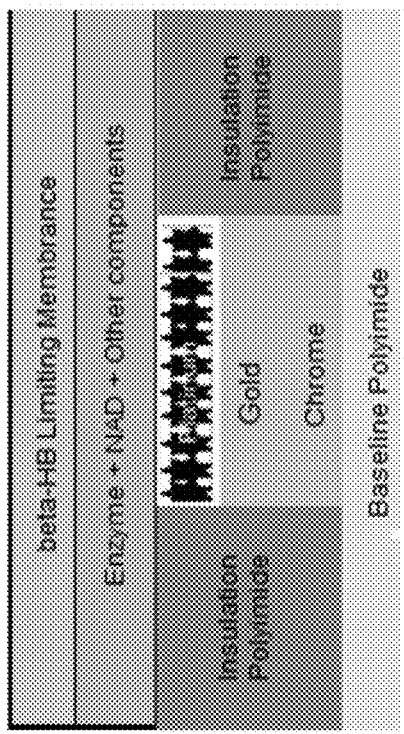
FIGS. 1A-1E provide schematics showing illustrative configurations for sensor electrodes formed from a plurality of planar layered elements.
Figure 1A:
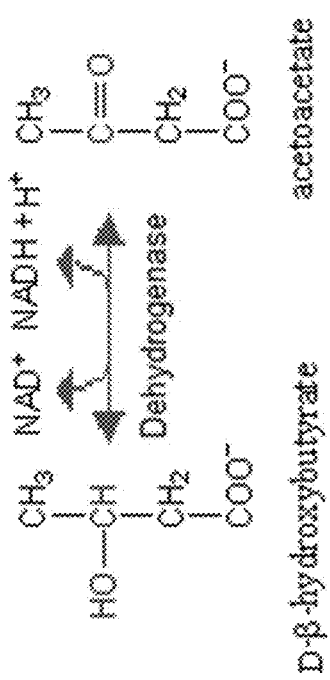
Figure 1B:
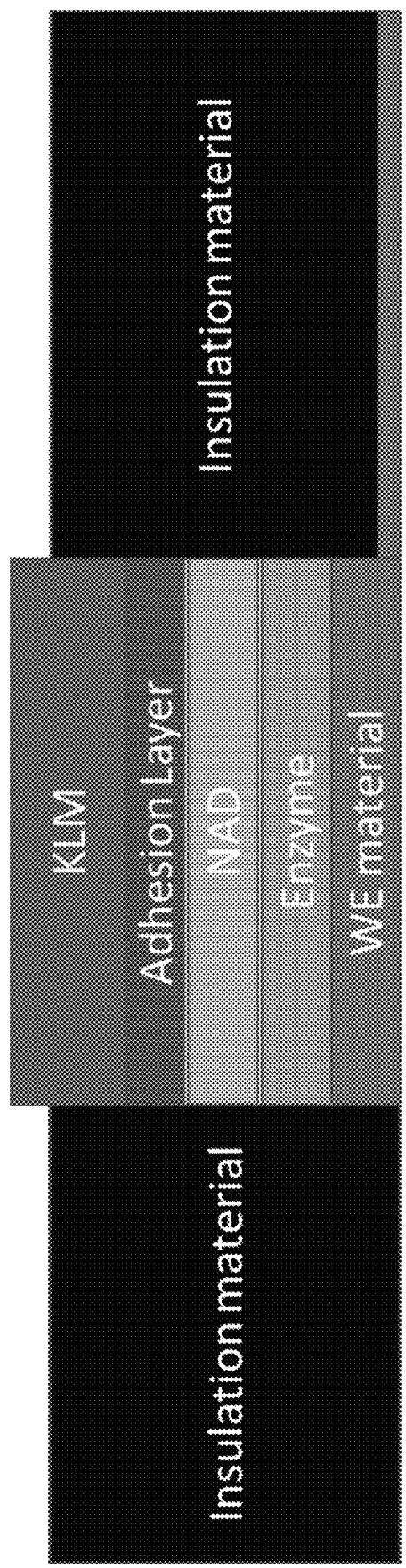
Figure 1C:
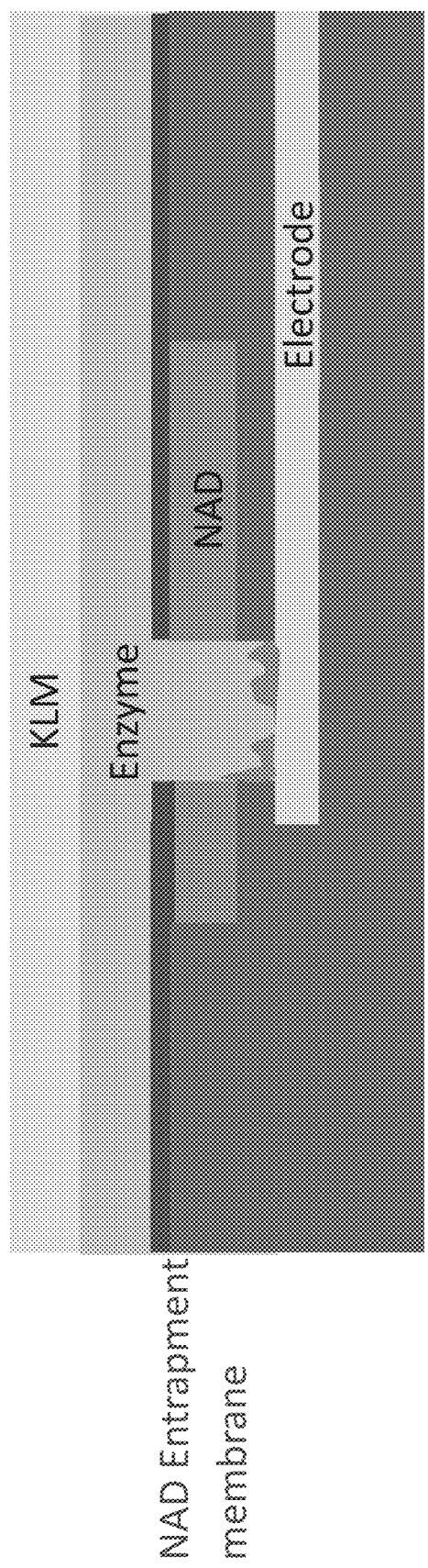

Unless otherwise defined, all terms of art, notations, and other scientific terms or terminology used herein are intended to have the meanings commonly understood by those of skill in the art to which this invention pertains. In some cases, terms with commonly understood meanings may be defined herein for clarity and/or for ready reference, and the inclusion of such definitions herein should not necessarily be construed to represent a substantial difference over what is generally understood in the art. Many of the techniques and procedures described or referenced herein are well understood and commonly employed using conventional methodology by those skilled in the art. As appropriate, procedures involving the use of commercially available kits and reagents are generally carried out in accordance with manufacturer defined protocols and/or parameters unless otherwise noted. A number of terms are defined below.

All numbers recited in the specification and associated claims that refer to values that can be numerically characterized with a value other than a whole number (e.g., a unit of measurement such as a concentration of a component in a composition) are understood to be modified by the term "about". Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. Furthermore, all publications mentioned herein are incorporated herein by reference to disclose and describe the methods and/or materials in connection with which the publications are cited. Publications cited herein are cited for their disclosure prior to the filing date of the present application. Nothing here is to be construed as an admission that the inventors are not entitled to antedate the publications by virtue of an earlier priority date or prior date of invention. Further the actual publication dates may be different from those shown and require independent verification.

The term "analyte" as used herein is a broad term and is used in its ordinary sense, including, without limitation, to refer to a substance or chemical constituent in a fluid such as a biological fluid (for example, blood, interstitial fluid, cerebral spinal fluid, lymph fluid or urine) that can be analyzed. Analytes can include naturally occurring substances, artificial substances, metabolites, and/or reaction products. In common embodiments, the analyte is 3-hydroxybutyrate and/or glucose.

The term "sensor" for example in "analyte sensor," is used in its ordinary sense, including, without limitation, means used to detect a compound such as an analyte. A "sensor system" includes, for example, elements, structures and architectures (e.g., specific 3-dimensional constellations of molecular elements) designed to facilitate sensor use and function. Sensor systems can include, for example, compositions such as those having selected material properties, as well as electronic components such as elements and devices used in signal detection and analysis (e.g., current detectors, monitors, processors and the like).

As discussed in detail below, embodiments of the invention relate to the use of an electrochemical sensor that measures a concentration of one or more analytes of interest or a substance indicative of the concentration or presence of the analytes in fluid. In some embodiments, the sensor is a continuous device, for example a subcutaneous, interstitial, transdermal, or intravascular device. In some embodiments, the device can analyze a plurality of intermittent samples. The sensor embodiments disclosed herein can use any known method, including invasive, minimally invasive, and non-invasive sensing techniques, to provide an output signal indicative of the concentration of the analyte of interest. Typically, the sensor is of the type that senses a product or reactant of an enzymatic reaction between an analyte and an enzyme as a measure of the analyte in vivo or in vitro. Such sensors typically comprise one or more membranes surrounding the enzyme through which one or more analytes migrate. The product is then measured using electrochemical methods and thus the output of an electrode system functions as a measure of the analyte(s).

Embodiments of the invention disclosed herein provide sensors of the type used, for example, in subcutaneous or transcutaneous monitoring of blood glucose levels in a diabetic patient. A variety of implantable, electrochemical biosensors have been developed for the treatment of diabetes and other life-threatening diseases. Many existing sensor designs use some form of immobilized enzyme to achieve their bio-specificity. Embodiments of the invention described herein can be adapted and implemented with a wide variety of known electrochemical sensors, including for example, U.S. Patent Application No. 20050115832, U.S. Pat. Nos. 6,001,067, 6,702,857, 6,212,416, 6,119,028, 6,400,974, 6,595,919, 6,141,573, 6,122,536, 6,512,939 5,605,152, 4,431,004, 4,703,756, 6,514,718, 5,985,129, 5,390,691, 5,391,250, 5,482,473, 5,299,571, 5,568,806, 5,494,562, 6,120,676, 6,542,765, 7,033,336 as well as PCT International Publication Numbers WO 01/58348, WO 04/021877, WO 03/034902, WO 03/035117, WO 03/035891, WO 03/023388, WO 03/022128, WO 03/022352, WO 03/023708, WO 03/036255, WO03/036310 WO 08/042,625, and WO 03/074107, and European Patent Application EP 1153571, the contents of each of which are incorporated herein by reference.

Illustrative Embodiments of the Invention and Associated Characteristics

Diabetic ketoacidosis (DKA), a severe complication of diabetes mellitus with potentially fatal consequences, is characterized by hyperglycemia and metabolic acidosis due to the accumulation of ketone bodies. Ketone bodies, namely 3-hydroxybutyrate (3-OHB), acetoacetate, and acetone are small fuel substrates, which uniquely can substitute and alternate with glucose under conditions of fuel and food deficiency. Diabetic ketoacidosis can be managed in people with diabetes by monitoring both glucose and ketone bodies. However, despite major advances in diabetes management with the emergence of new-generation continuous glucose monitoring (CGM) devices capable of in vivo monitoring of glucose directly in the interstitial fluid (ISF), the continuous monitoring of ketone bodies is yet to be addressed. This is in large part because the development of efficient bioelectronic interfaces is especially challenging for cofactor-dehydrogenase enzymes.

One challenge in developing an amperometric ketone sensor for in vivo use is that the principal enzyme used to detect the ketone 3-hydroxybuterate (3HB) is 3-hydroxybuterate dehydrogenase. Like most dehydrogenase enzymes, it requires the cofactor NAD+, which itself gets reduced to NADH as part of the enzymatic reaction. Conventionally, ketones are measured by a fingerstick strip and meter method similar to glucose meter measurement. These strips work measuring the NADH produced enzymatically from the ketone-enzyme reaction. The NADH in turn is oxidized by the mediator, which in turn is oxidized by the electrode. A schematic of this reaction appears in FIG. 5. One critical issue is that mediators conventionally used in strips are highly toxic compounds such as ferrocene and ferrocyanide, which are free chemicals (in they are not fixed or bound to anything) in the strip and can therefore migrate in aqueous environments. This poses a significant issue when considering their use in continuous in vivo measurement. Another critical issue is the need for excess cofactor NAD+ in the enzymatic reaction. Strips avoid problems with this by supplying more than enough NAD+ that is needed for appropriate reaction stoichiometry. Naturally an in-vivo device would need a similar supply of NAD+, or more rationally, a method to entrap or bind NAD+ and also allow it to be regenerated from NADH.

Embodiments of the invention disclosed herein provide electrochemical analyte sensors designed to include compositions that provide these sensors with enhanced functional and/or material properties including enhanced enzyme reaction stoichiometries. As discussed in detail below, typical embodiments of the invention relate to the use of a sensor that measures a concentration of an aqueous analyte of interest or a substance indicative of the concentration or presence of the analyte in vivo (e.g., 3-hydroxybutyrate and glucose). In some embodiments of the invention, the sensor is a subcutaneous, intramuscular, intraperitoneal, intravascular or transdermal device.

Figure 5A:
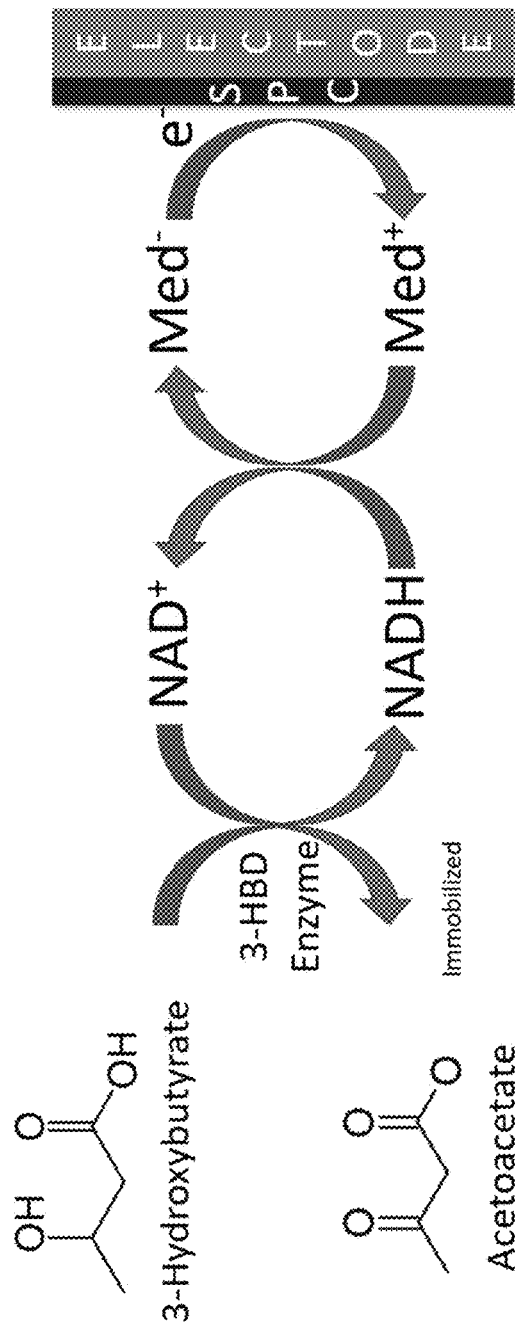
FIGS. 5A-5B show schematics of 3-hydroxybutyrate reacting with 3-hydroxybutyrate dehydrogenase along with NAD and a mediator at an electroactive electrode material surface (FIG. 5A) and the electrochemical reactions that occur at the electrode (FIG. 5B).
Figure 5B:

FIGS. 5A-5B show schematics of 3-hydroxybutyrate reacting with 3-hydroxybutyrate dehydrogenase along with NAD and a mediator at an electroactive electrode material surface (FIG. 5A) and the electrochemical reactions that occur at the electrode (FIG. 5B). Embodiments of the invention are designed to overcome challenges with 3-hydroxybuterate dehydrogenase reaction stoichiometry, as well as NAD mediator toxicity and other issues that arise with continuous ketone monitoring. For example, embodiments of the invention are designed to localize 3-hydroxybuterate dehydrogenase, NAD+/NADH and a mediator together in operable contact on an electrode in an amperometric sensor system. This constellation of elements allows sensors to transduce current and also inhibits any potentially dangerous mediators from diffusing out of the sensor and into tissue in which the sensor is implanted. As discussed below, in illustrative embodiments of this, an element such as the mediator is embedded carbon paste or carbon ink of an electrode. Alternatively, an element such as the mediator can be bound to the electrode either directly or via a linkage molecule. Alternatively, an element such as the mediator can be entrapped within a polymer, for example a redox polymer (such as PEDOT) that facilitates electron transport to the electrode.

Embodiments of the invention include amperometric analyte sensor systems comprising a 3-hydroxybutyrate sensing electrode having the constellation of elements disclosed herein. Typically, such 3-hydroxybutyrate sensing electrodes include a layer of an electrode electroactive material (i.e. the region/portion of the electrode that monitors alterations in current in the sensors of the invention); an enzyme layer comprising 3-hydroxybutyrate dehydrogenase enzyme in operable contact with the electroactive material; a nicotinamide adenine dinucleotide in operable contact with the 3-hydroxybutyrate dehydrogenase enzyme; a mediator in operable contact with the nicotinamide adenine dinucleotide; and a 3-hydroxybutyrate modulating layer disposed over the enzyme layer, wherein the 3-hydroxybutyrate modulating layer comprises a composition that modulates the diffusion of 3-hydroxybutyrate through the 3-hydroxybutyrate modulating layer.

Various working, counter, reference and background electrodes can be included within the sensors disclosed herein and formed in a number of different configurations. For example, in some embodiments of the invention, the amperometric analyte sensor includes a background electrode, for example one where this background electrode does not comprise at least one layered material disclosed herein such as an analyte sensing layer, an analyte modulating layer; or an interference rejection layer. Such background electrodes can, for example, be included in various amperometric analyte sensor embodiments of the invention (e.g. ketone sensors and/or multimodal glucose and ketone sensors) in order to compare signals obtained from these background electrodes with signals obtained from one or more working electrodes comprising an analyte sensing enzyme in order to isolate and correct for non-analyte signals that may confound optimized sensor analyte detection (i.e., so as to allow the analyte sensor systems to incorporate comparative signal corrections). In addition, such embodiments of the invention can, for example, be used to facilitate the calibration of the amperometric analyte sensors disclosed herein. Illustrative systems having such background electrodes are disclosed in U.S. patent application Ser. No. 17/162,885 filed on Jan. 29, 2021, and entitled INTERFERENCE REJECTION MEMBRANES USEFUL WITH ANALYTE SENSORS, the contents of which are incorporated by reference.

A variety of mediators known in the art can be adapted for use with embodiments of the invention. Illustrative mediators are disclosed in Prieto-Simon et al., Biosens Bioelectron. 2004 May 15; 19(10):1131-8; Kochius et al., "Immobilized redox mediators for electrochemical NAD(P)+ regeneration" 2012 Applied Microbiology and Biotechnology 93(6):2251-64; Immanuel et al., "Recent Progress and Perspectives on Electrochemical Regeneration of Reduced Nicotinamide Adenine Dinucleotide (NADH)" CHEMISTRY Volume 15, Issue 24; 2020; Pages 4256-4270; Matsue et al., Biochim Biophys Acta. 1990 Mar. 29; 1038(1):29-38; and US Patent Application Publication Nos. 20070289881, 20160083858 and 20180143155.

Typically, the 3-hydroxybutyrate and/or glucose modulating layer of the sensor comprises a cellulose acetate polymer, a poly-2-hydroxyethyl methacrylate polymer, a polyurethane/polyurea polymer, a branched acrylate polymer or the like. In certain embodiments of the invention, the material for this layer is selected as one which limits/inhibits the rate at which ketone diffuses into the sensor while simultaneously limiting the rate at which NAD leaches out of sensor. In other embodiments, a first sensor layer limits/inhibits the rate at which ketone diffuses into the sensor while a second sensor layer limits the rate at which NAD leaches out of sensor.

In typical embodiments of the invention, the 3-hydroxybutyrate dehydrogenase enzyme, the mediator and/or the nicotinamide adenine dinucleotide is coupled to the electroactive material. For example, in embodiments of the invention, the 3-hydroxybutyrate dehydrogenase enzyme the mediator and/or the nicotinamide adenine dinucleotide can be entrapped within a polymer disposed over the electroactive material. In this context, a wide variety of materials can be used to entrap elements of the invention and/or modulate the diffusion of molecules in or out or otherwise within the sensor, for example, a cellulose acetate polymer, a poly-2-hydroxyethyl methacrylate polymer, a polyurethane/polyurea polymer, a branched acrylate polymer, hexamethyldisiloxane (HMDSO), parylene-C, thin film ceramics (e.g., ALD TiO2) and the like. In certain embodiments of the invention, a polymer that forms a layer of the sensor (e.g., one that is used to entrap an enzyme or NAD or the like) can be crosslinked to enhance its material properties. In this context, a variety of different crosslinking agents can be used in such embodiments of the invention, for example, MPP, glutaraldehyde or the like, (see, e.g., Maitra et al., American Journal of Polymer Science 2014, 4(2): 25-31 and Tillet et al., Progress in Polymer Science Volume 36, Issue 2, February 2011, Pages 191-217).

In some embodiments of the invention, an element such as the mediator is entrapped within a redox polymer disposed over the electroactive material (e.g., redox polymers based on poly (3,4-ethylenedioxythiophene) (PEDOT) and the like). Redox polymers are those polymers that can undergo reversible oxidation (loss of electrons) and reduction (gain of electrons) processes. These polymers contain electroactive sites or groups that sustain these redox processes, which can be located in the main polymer backbone, as in the case of electrically conducting polymers such as polypyrrole, or in the polymer's sidechain, as in the case of a polymer bearing a ferrocene group. Illustrative redox polymers and associated agents that can be adapted for use in embodiments of the invention are disclosed in Abdellaoui et al., Chem Commun (Camb). 2016 Jan. 21;52(6):1147-50; Yuan et al., ACS Catal. 2019, 9, 6, 5486-5495; and US Patent Application Publication Nos. 20060042944, 20030168338, 20060160100, 20200295370, 20200194190, 20190233869 and 20170260560.

Figure 6A:
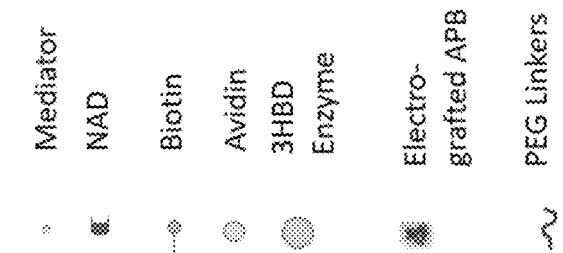
FIGS. 6A-6C show schematics of nicotinamide adenine dinucleotide ("NAD") immobilization and regeneration strategies.
Figure 6A:
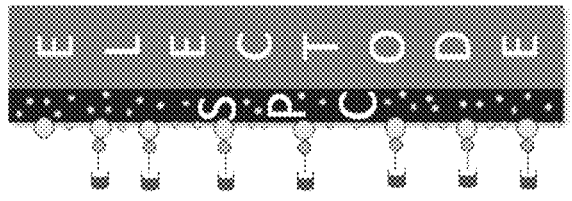
Figure 6A:
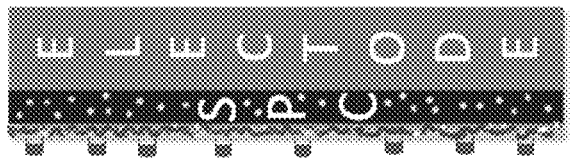
Figure 6A:
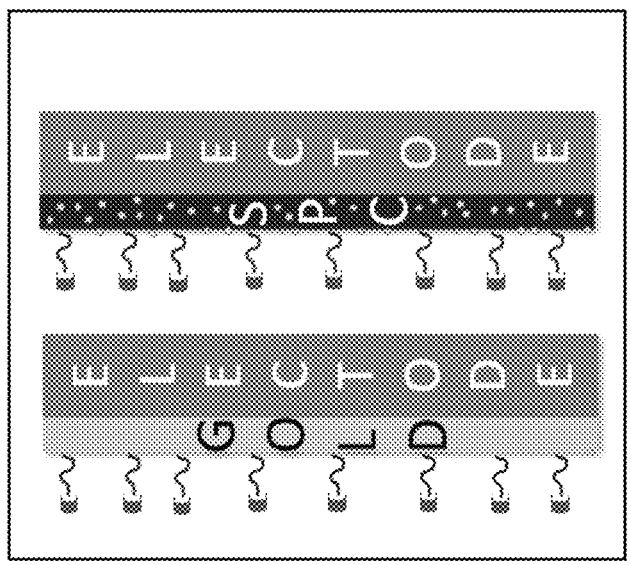
Figure 6B:
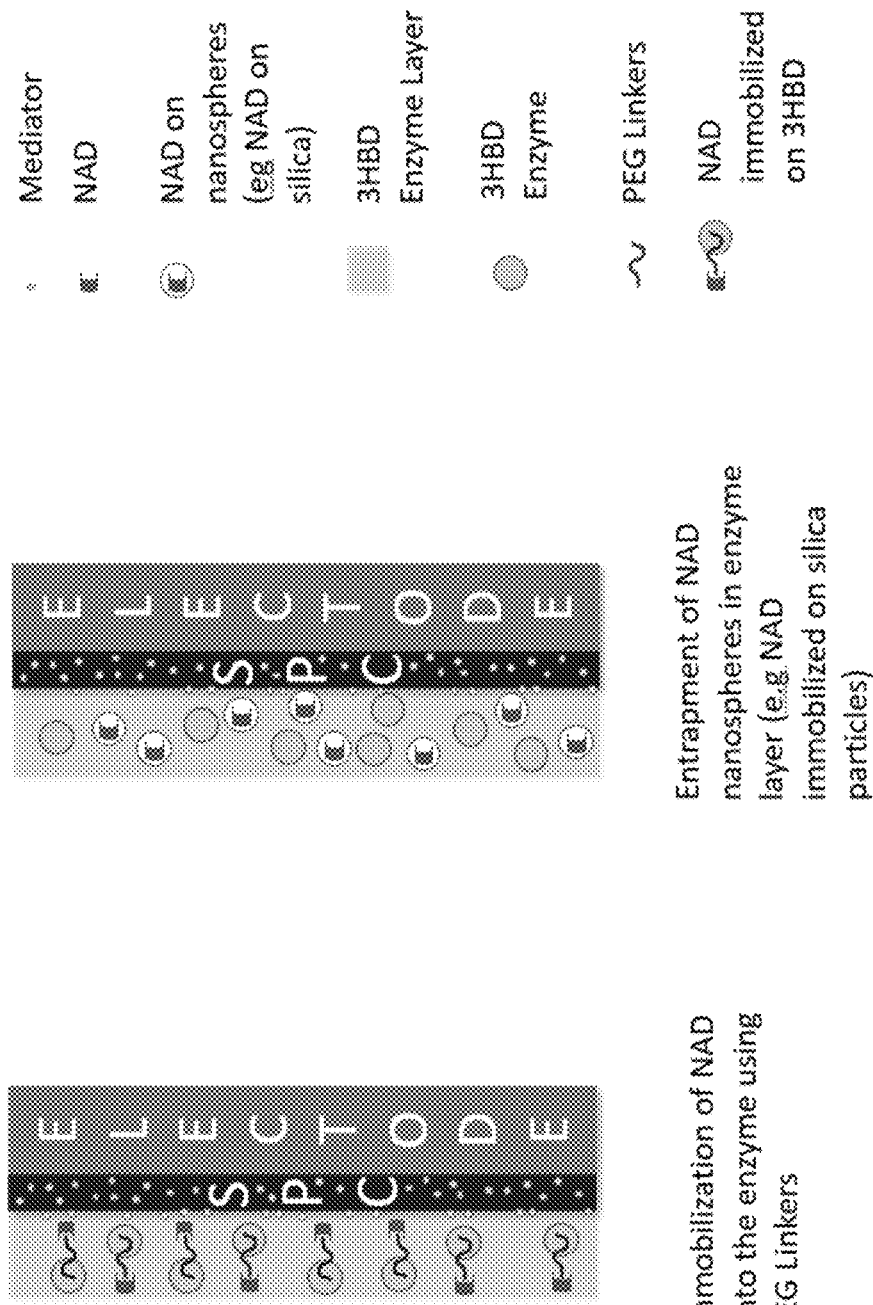
Figure 6C:
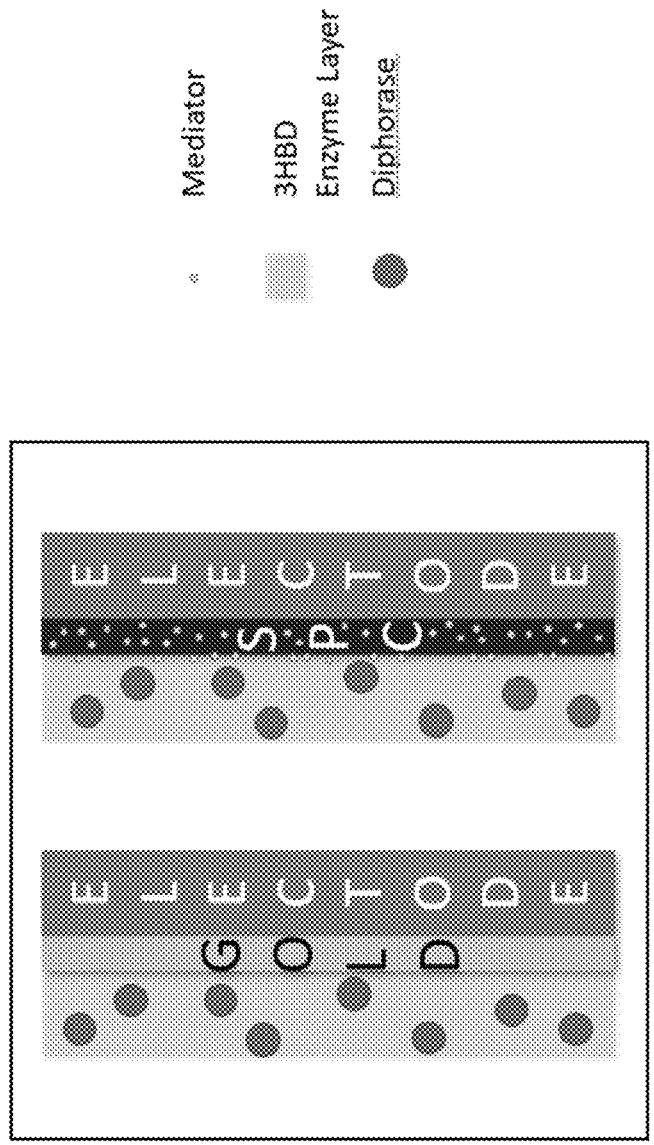
Figure 8A:
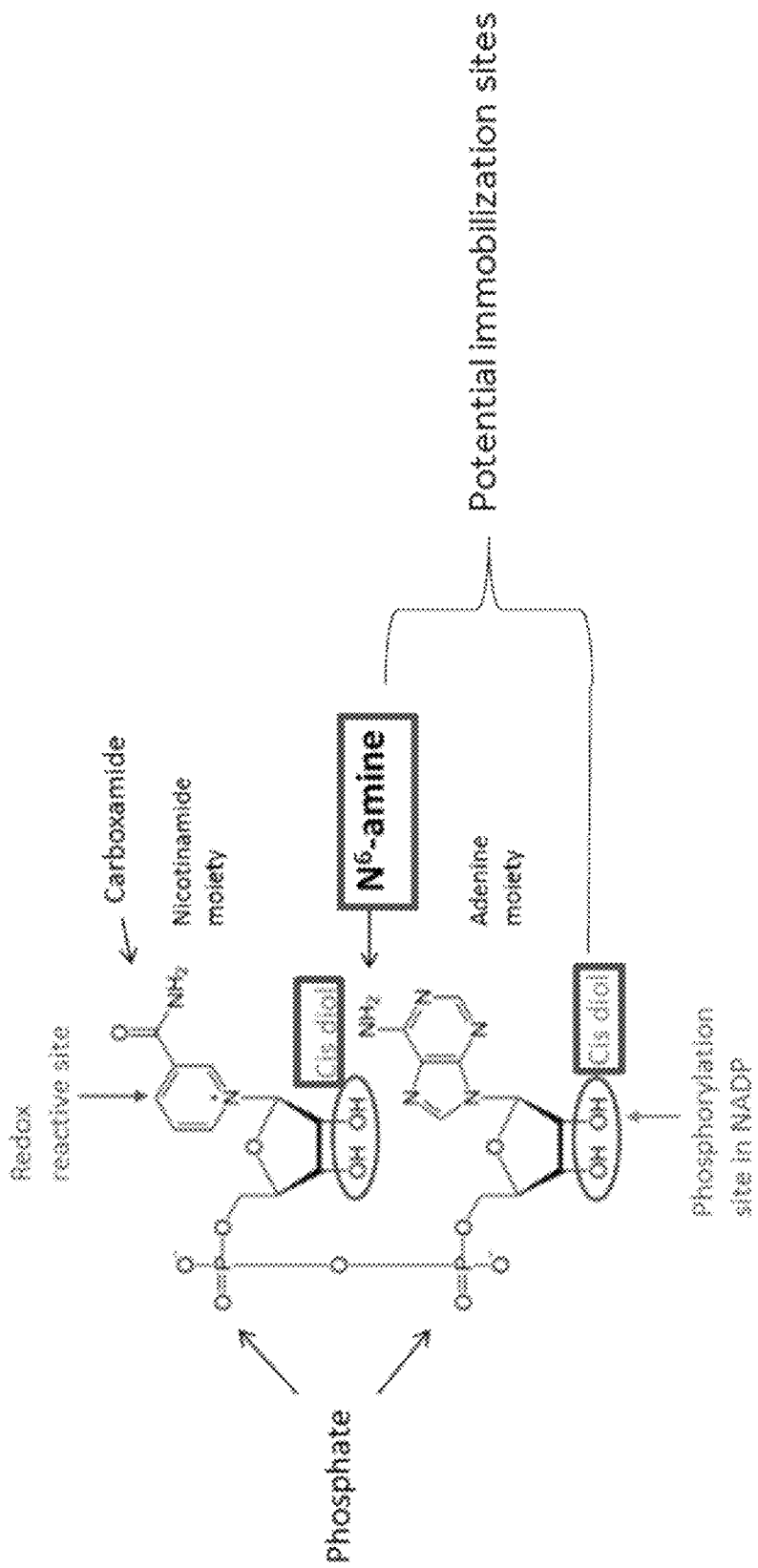
FIGS. 8A-8C show schematics of immobilization strategies for nicotinamide adenine dinucleotide ("NAD"). Heterotrifunctional linking molecules can be used for the immobilization of NAD+ & NADP+ with a mediator (TBO) and alcohol dehydrogenase. NAD has two cis-diols, so NAD can bind to the boronic acid in two possible conformations which can affect its ability to bind to the enzyme and affect catalytic efficiency. Bond formed between boronate and NAD is relatively unstable, with a dissociation constant (Kd) of 5.9×10-3 M-1S-1.
Figure 8B:
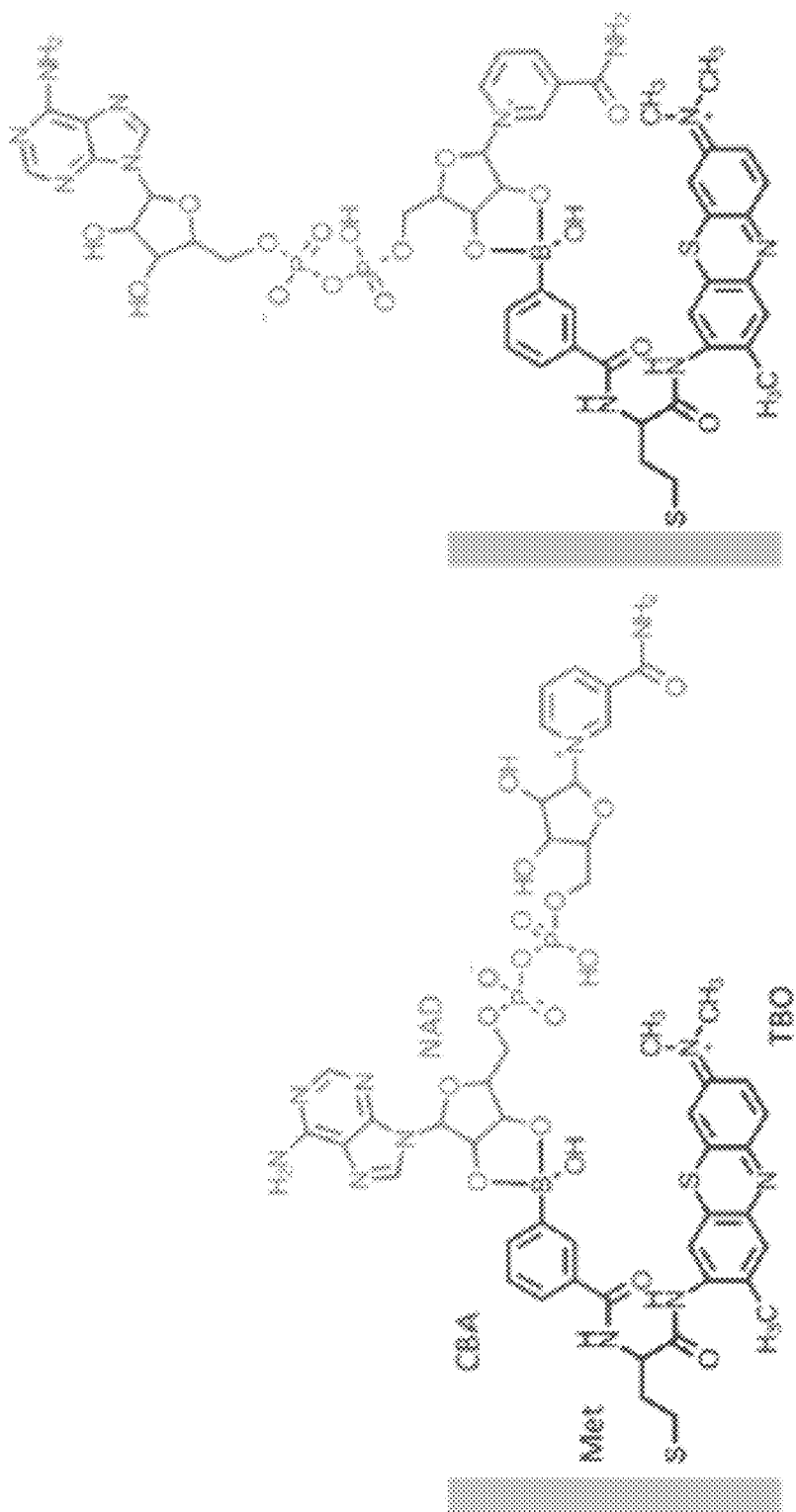
Figure 8C:
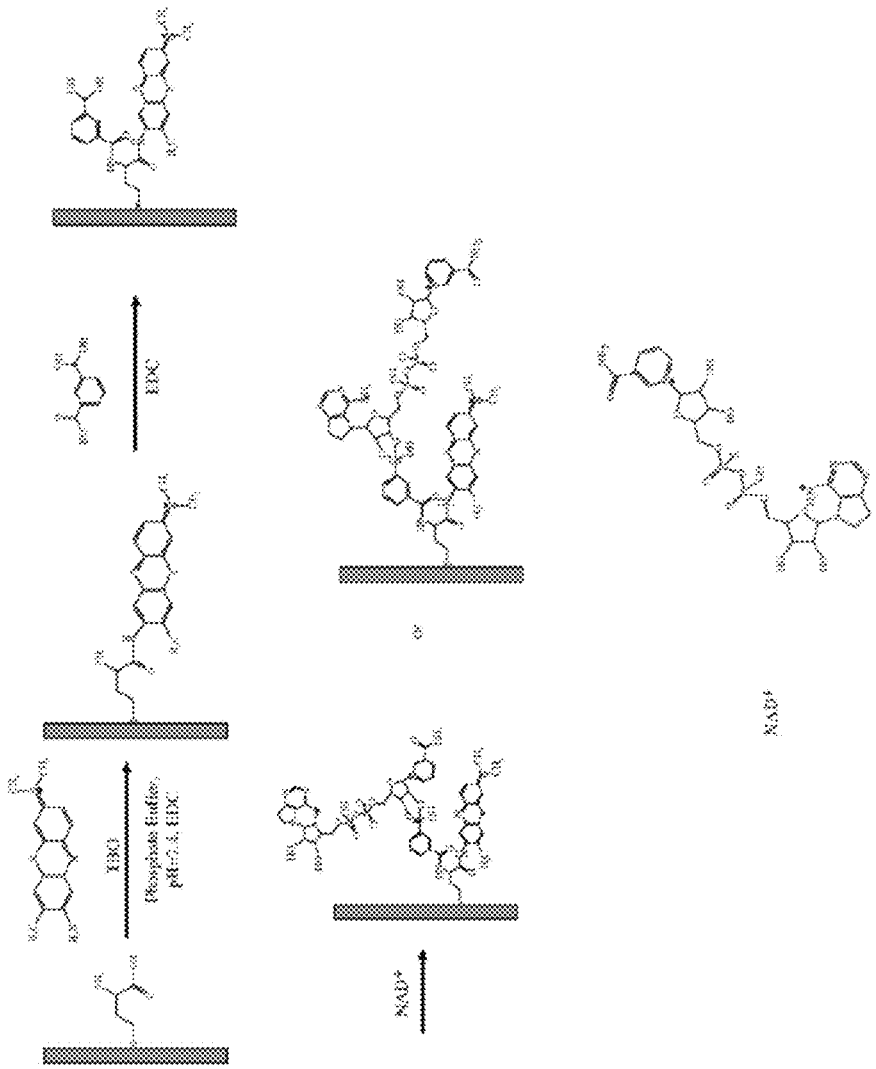
Figure 8C:
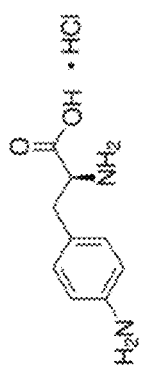
Figure 9A:
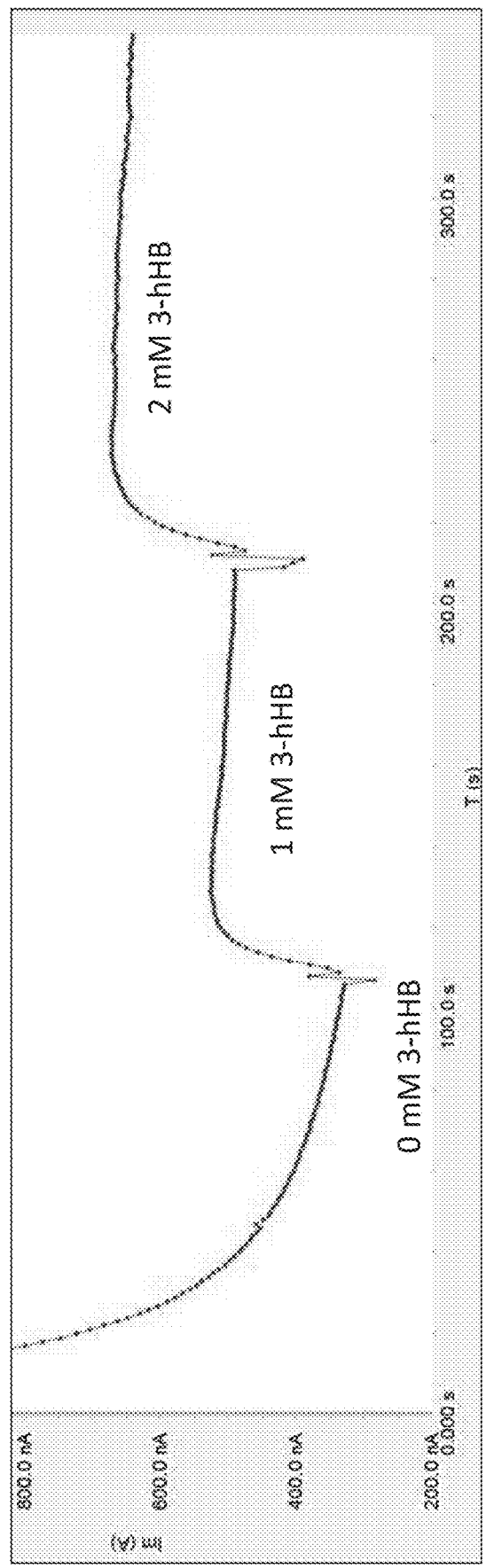
FIGS. 9A-9G show data from studies illustrating the functionality of embodiments of the invention.
Figure 9B:
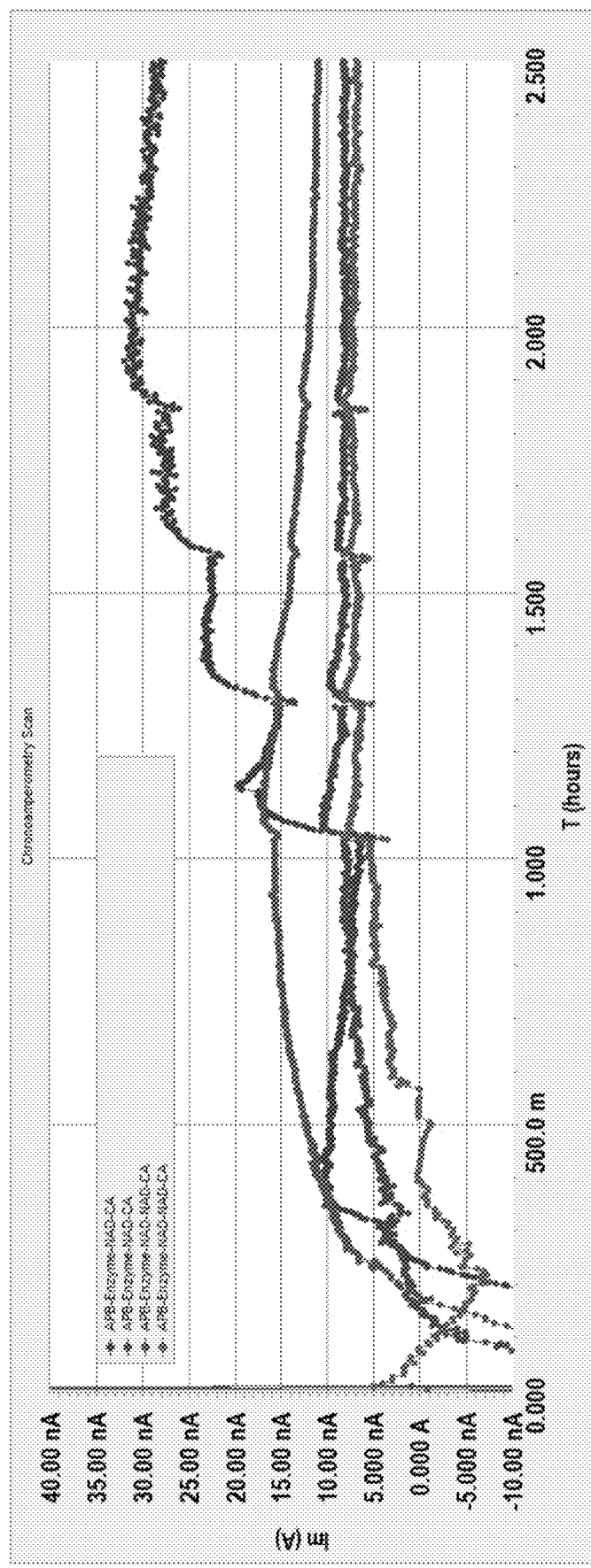
Figure 9C:
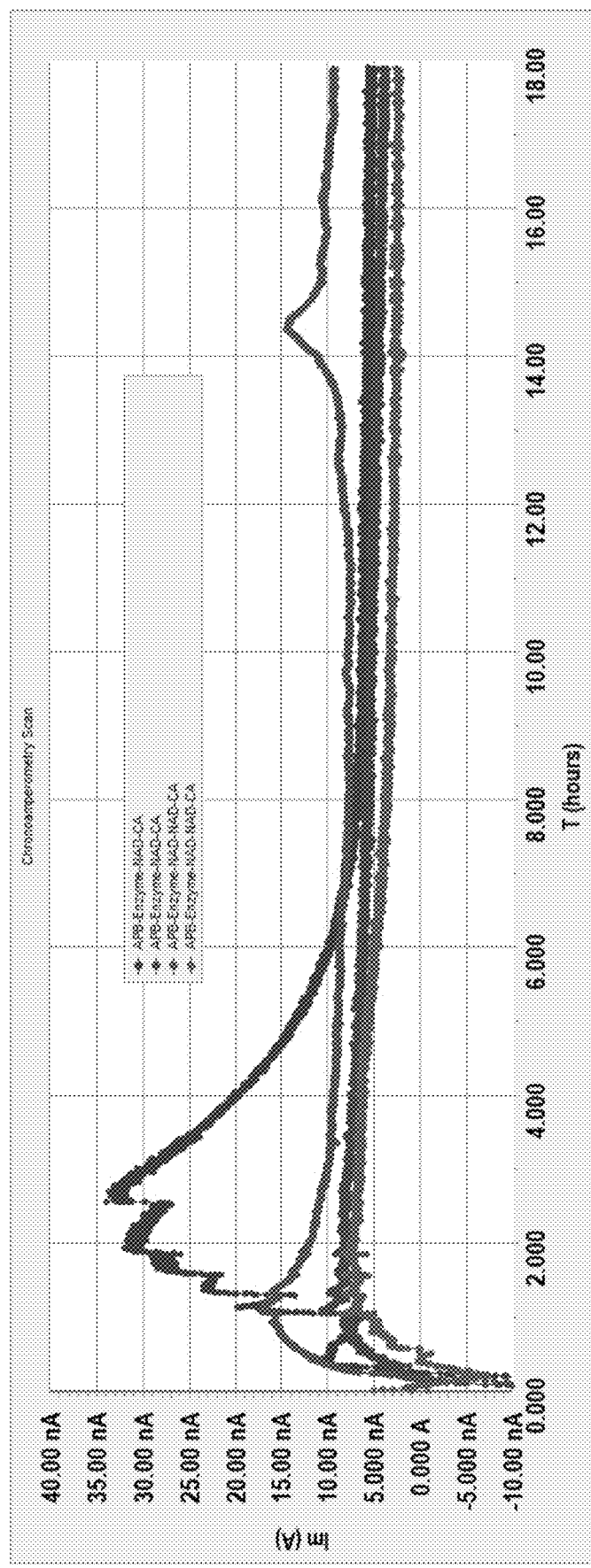
Figure 9D:
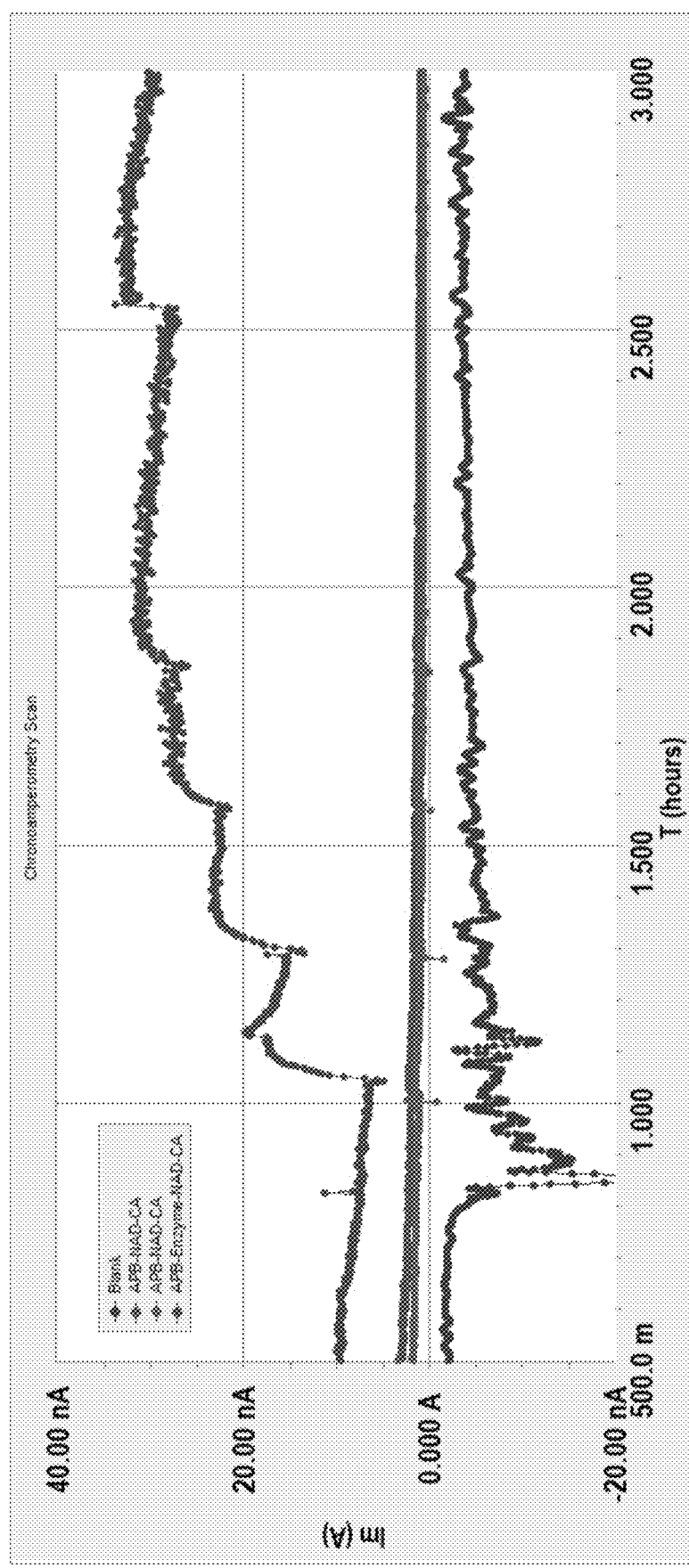
Figure 9E:
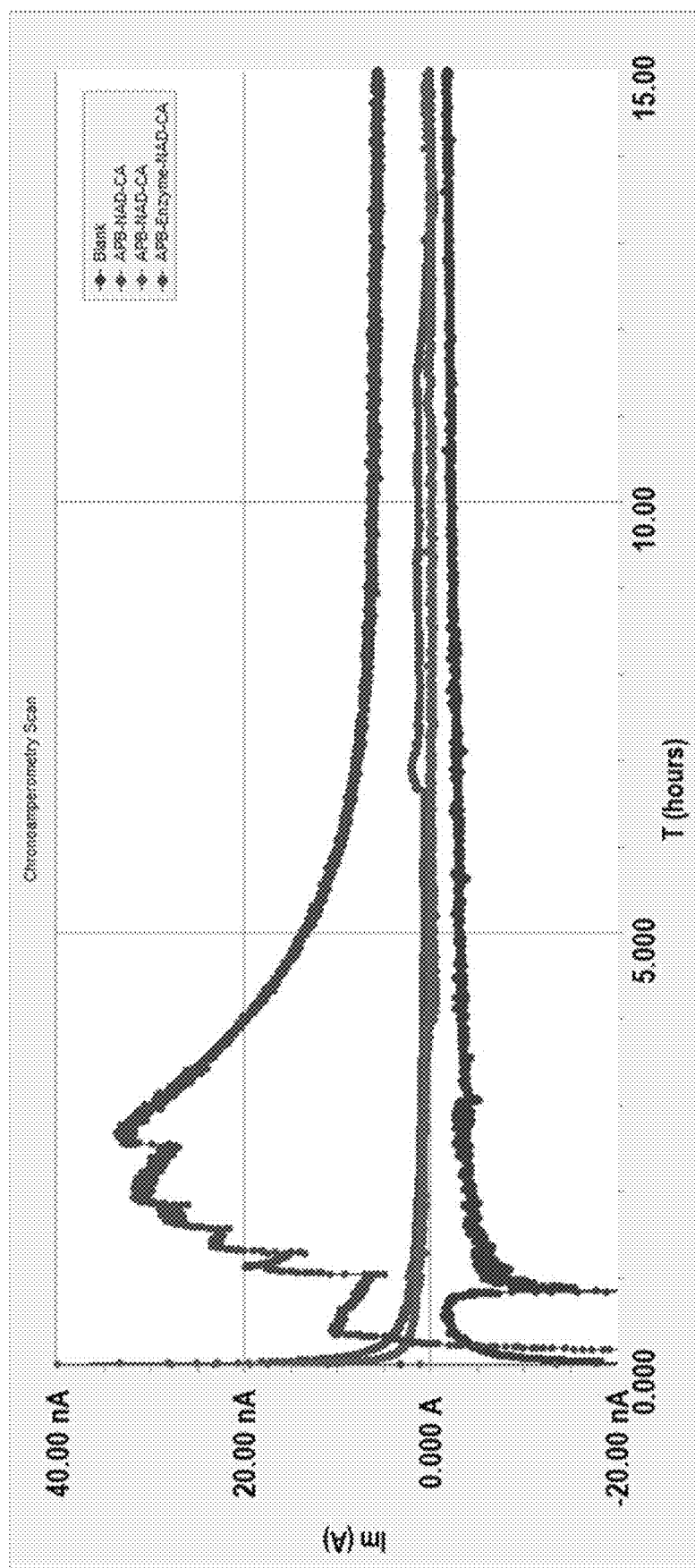
Figure 9F:
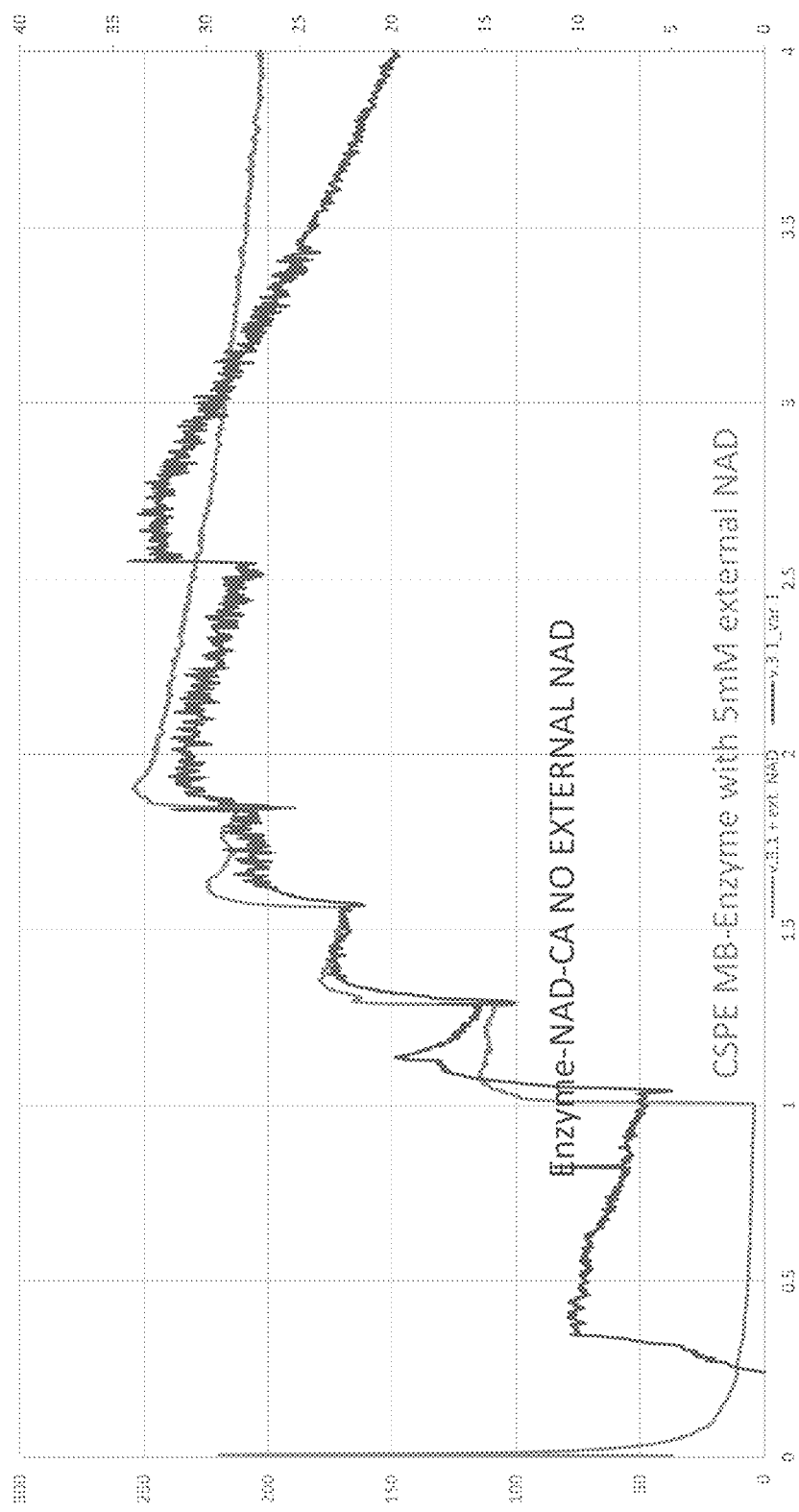
Figure 9G:
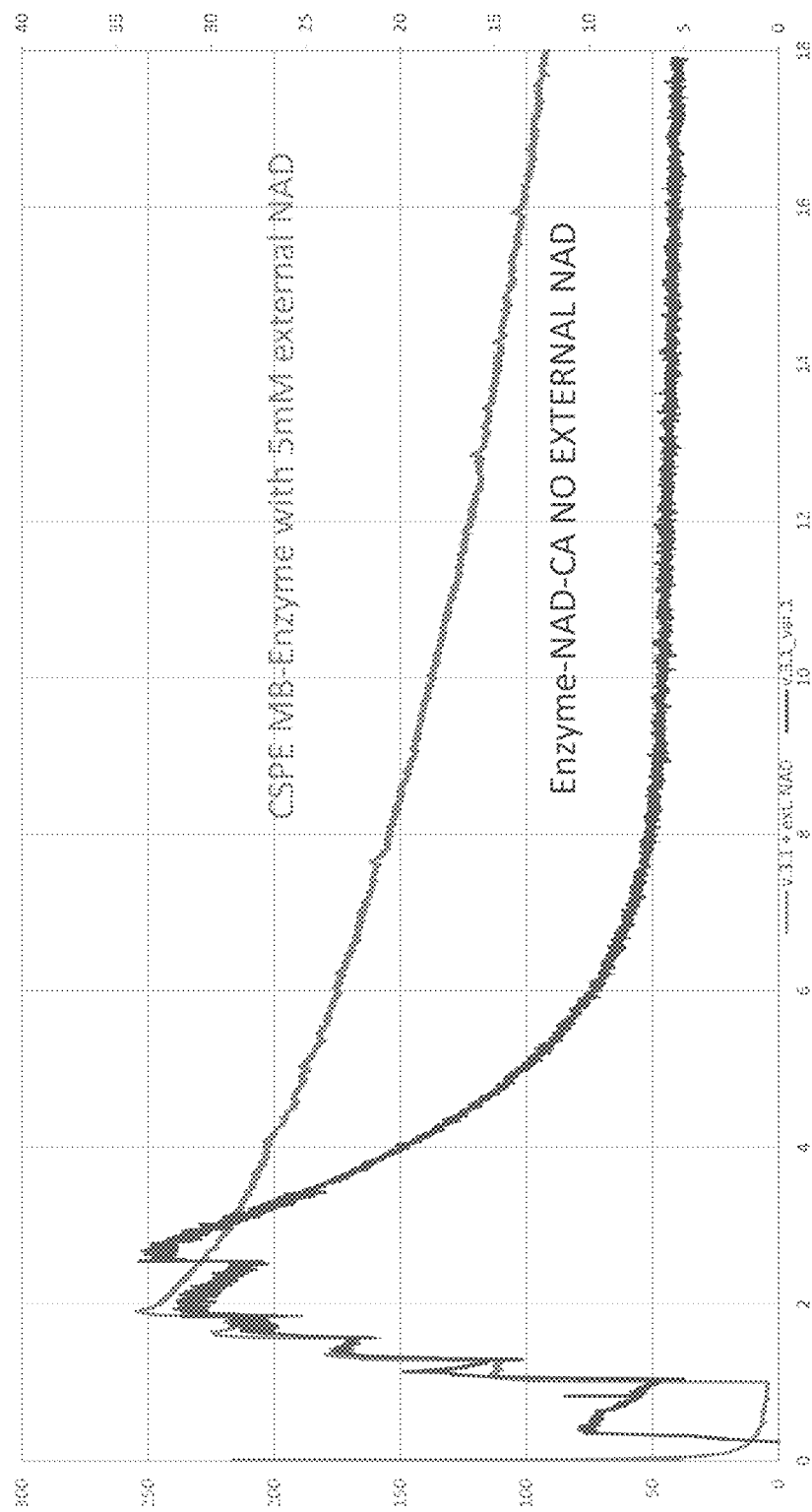

In certain embodiments of the invention, the mediator and/or the nicotinamide adenine dinucleotide can be coupled to the electrode electroactive material via an interaction between avidin and biotin (e.g. where avidin is coupled the mediator and/or nicotinamide adenine and biotin is coupled to the electroactive material, or where biotin is coupled the mediator and/or nicotinamide adenine and avidin is coupled to the electroactive material). In some embodiments of the invention, the nicotinamide adenine dinucleotide can be coupled to the electroactive material via an interaction between nicotinamide adenine dinucleotide and a compound comprising a phenylboronic acid moiety (see, e.g. Wang et al., J. Am. Chem. Soc. 2016, 138, 33, 10394-10397; Raitman et al., J Am Chem Soc. 2002 Jun. 5; 124(22):6487-96; and Kip et al., Colloids and Surfaces B: Biointerfaces Volume 174, 1 Feb. 2019, Pages 333-342). FIGS. 8A-8C show schematics of immobilization sites and strategies for nicotinamide adenine dinucleotide ("NAD") using boronic acid compounds. Boronic acids are known in the literature to have an affinity to bind to dihydroxy or cis-diol functionality which is typically found on various sugars and carbohydrates. The presence of two ribose moieties on the cofactor NAD facilitates the affinity binding of NAD to the electrode. This can be achieved through electrografting either a phenylboronic acid species which is covalently bounded to the electrode or via an alternate heterobifunctional linker (also electrografted) which enables both the cofactor and mediator to be tethered to the electrode. In the former approach, an electropolymerized mediator would be required in order to regenerate the reduced co-factor. In certain embodiments of the invention, the mediator and/or the nicotinamide adenine dinucleotide is covalently coupled to the electroactive material (e.g., via a linking agent). Other immobilization strategies can be used. For example, FIG. 6A shows schematics of nicotinamide adenine dinucleotide ("NAD") immobilization strategies using PEG linkers (left panel), electrografted 3-aminophenylboronic acids (APB) (middle panel) and avidin/biotin (right panel). FIG. 6B shows schematics of nicotinamide adenine dinucleotide ("NAD") immobilization strategies using NAD entrapped within microspheres that are coupled to the electrode via PEG linkers (left panel) or entrapped within the analyte sensing enzyme layer (right panel). FIG. 6C shows schematics of a nicotinamide adenine dinucleotide ("NAD") regeneration strategy using diaphorase in the enzyme layer.

Electrografting of phenylboronic acid compounds can enable affinity binding to NAD co-factor to prevent or hinder diffusion leading to loss of co-factor. Using this strategy, the mediator can be electropolymerized onto the electrode to inhibit leaching from the electrode surface while retaining the ability to regenerate the co-factor. Additional embodiments of the invention comprise the electrografting of heterotrifunctional linker to enable functionalization with a phenylboronic acid (for affinity binding to NAD co-factor) and additional cross-linking to a mediator. This embodiment allows for the affinity binding to the NAD co-factor with the mediator in close proximity to the NAD co-factor to allow for regeneration. In this context, in certain embodiments of the invention, the size of a linker/tethering molecule used to localize the enzyme, NAD and/or mediator together in the sensor is selected to facilitate enzymatic reaction stoichiometry. Additional positively charged material layers (e.g., layers of positively charge polyelectrolytes) can be put down on top of this boronic acid affinity-NAD layer to inhibit leaching as the NAD has an inherent negative charge. Additional chemistry comprising positively changed polymers (e.g., chitosan) that can act as membranes or, alternatively cross-linked polyvinyl boronic acids (or avidin/biotin coupling) can be used to entrap the NAD co-factor within the stack of sensor layers. In certain embodiments of the invention, the electroactive material comprises a carbon paste or a carbon ink having the mediator embedded therein. Optionally, the mediator, the linking agent and/or the compound comprising a phenylboronic acid moiety is operatively coupled to the electroactive material via an electropolymerization process; and/or the linking agent comprises a heteropolyfunctional compound that is coupled to the electroactive material and the mediator and/or the nicotinamide adenine.

Figure 7A:
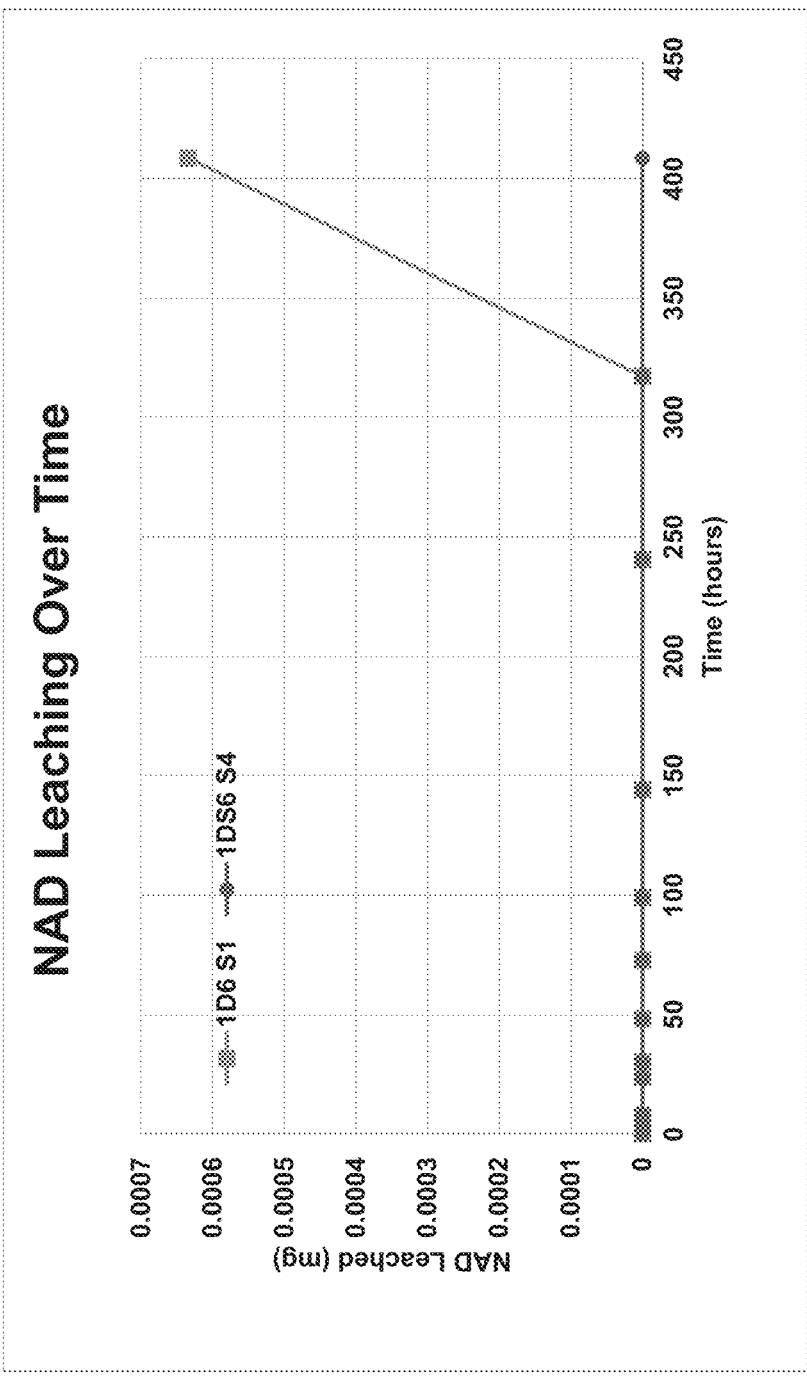
FIGS. 7A and 7B show graphed data of NAD leaching from sensor structures having barrier layers over time.
Figure 7B:
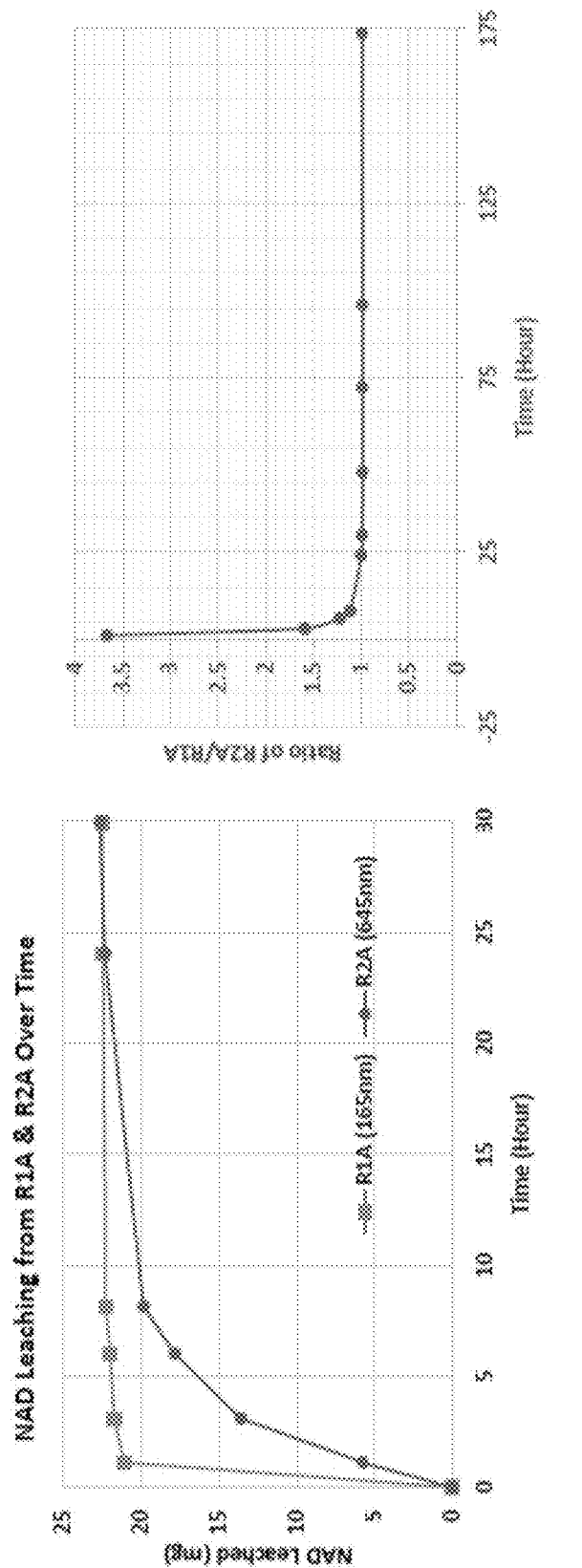

In embodiments of the invention, the 3-hydroxybutyrate (or glucose oxidase) working electrode can be coated with at least one further layer of material, for example a barrier layer disposed over the nicotinamide adenine dinucleotide, wherein the barrier layer inhibits the diffusion of nicotinamide adenine dinucleotide therethrough. FIG. 7A shows data from studies of NAD leaching in configurations where HMDSO is used as an entrapment/barrier membrane layer. FIG. 7B shows data from studies of NAD leaching in configurations where Paralyne is used as an entrapment/barrier membrane layer. Embodiments of these electrodes can also include other layers disclosed herein such as interference rejection layers, protein layers, adhesion promoting layers; and layers comprising poly-1-lysine polymers having molecular weights between 30 KDa and 300 KDa. For example, in certain embodiments of the invention, the nicotinamide adenine dinucleotide is disposed within or over or under a layer formed from a material that degrades over time so that nicotinamide adenine dinucleotide exhibits controlled release over time from a matrix within the amperometric analyte sensor system (see e.g., Del Sole et al., (2010) Synthesis of nicotinamide-based molecularly imprinted microspheres and in vitro controlled release studies, Drug Delivery, 17:3, 130-137).

There are a number of microbial 3-hydroxybutyrate dehydrogenase (3HBD) enzymes described in the art that can be adapted for use with embodiments of the invention disclosed herein. In certain embodiments of the invention, specific 3HBD enzymes were selected to have properties compatible for their use with embodiments of the ketone sensors disclosed herein, for example 3HBD enzymes that are not strongly susceptible to regulatory inhibitors. In one such embodiment, a novel isoform of 3HBD from *Ralstonia pickettii* T1 was utilized. This *Ralstonia pickettii* enzyme appears to specialize in metabolism of 3-hydroxybutyrate and may be less involved in regulating the cytoplasmic redox state than other 3HBD isoform (see, e.g., Takanashi, et al. Antonie van Leeuwenhoek volume 95, pages 249-262, 2009). *Ralstoniapicketii* T1 is a desirable isoform of the 3HBD enzyme for use with embodiments of the invention disclosed herein, and one fairly distinct from 3HBD enzymes produced in other microorganisms (a conclusion based on NCBI-BLAST search of sequenced genomes).

Embodiments of the invention include 3HBD enzymes selected to have stability and/or solubility profiles that are compatible for use with embodiments of the ketone sensors disclosed herein. In one illustrative embodiment, the 3HBD from *Pseudomonas fragi* was selected. This 3HBD enzyme embodiment comprises structures which appear to be helpful for sensor stability.

Figure 2A:
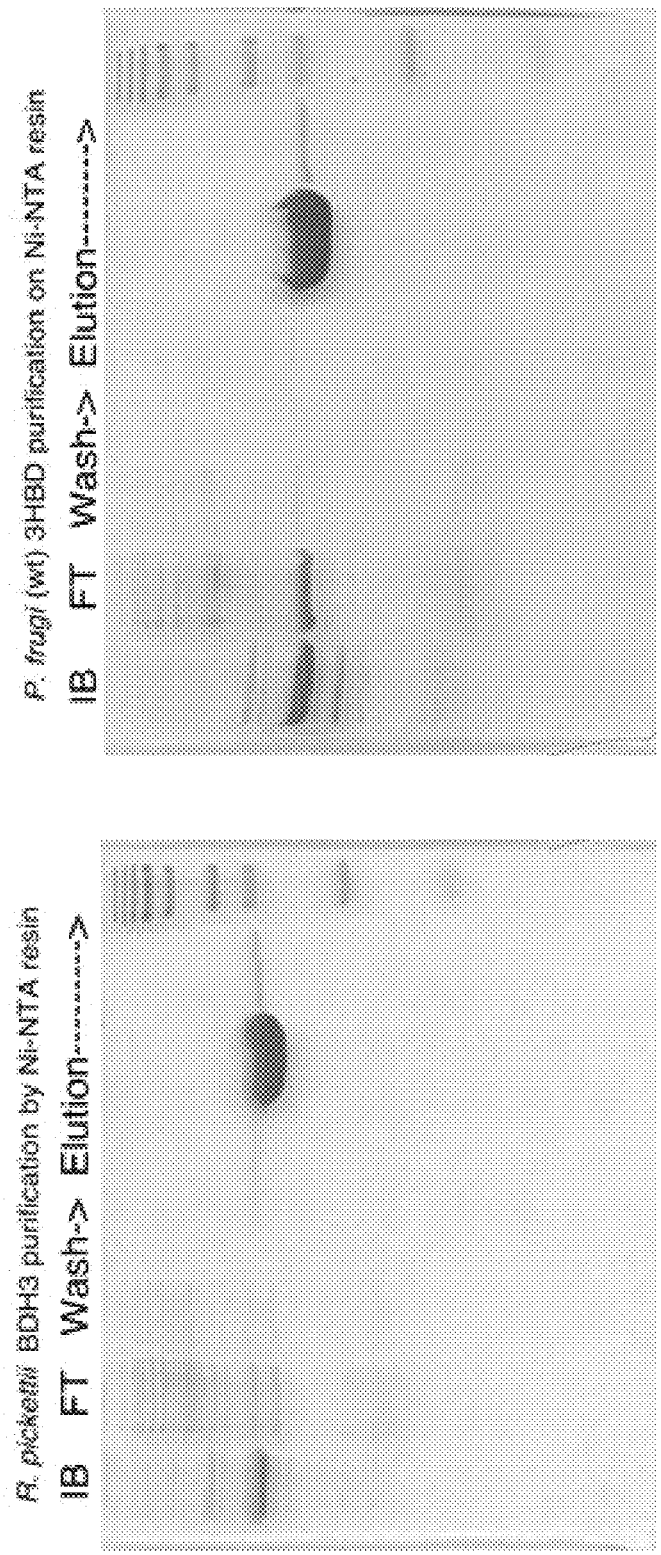
FIGS. 2A-2D show data from studies of various 3HBD isoforms.
Figure 2B:
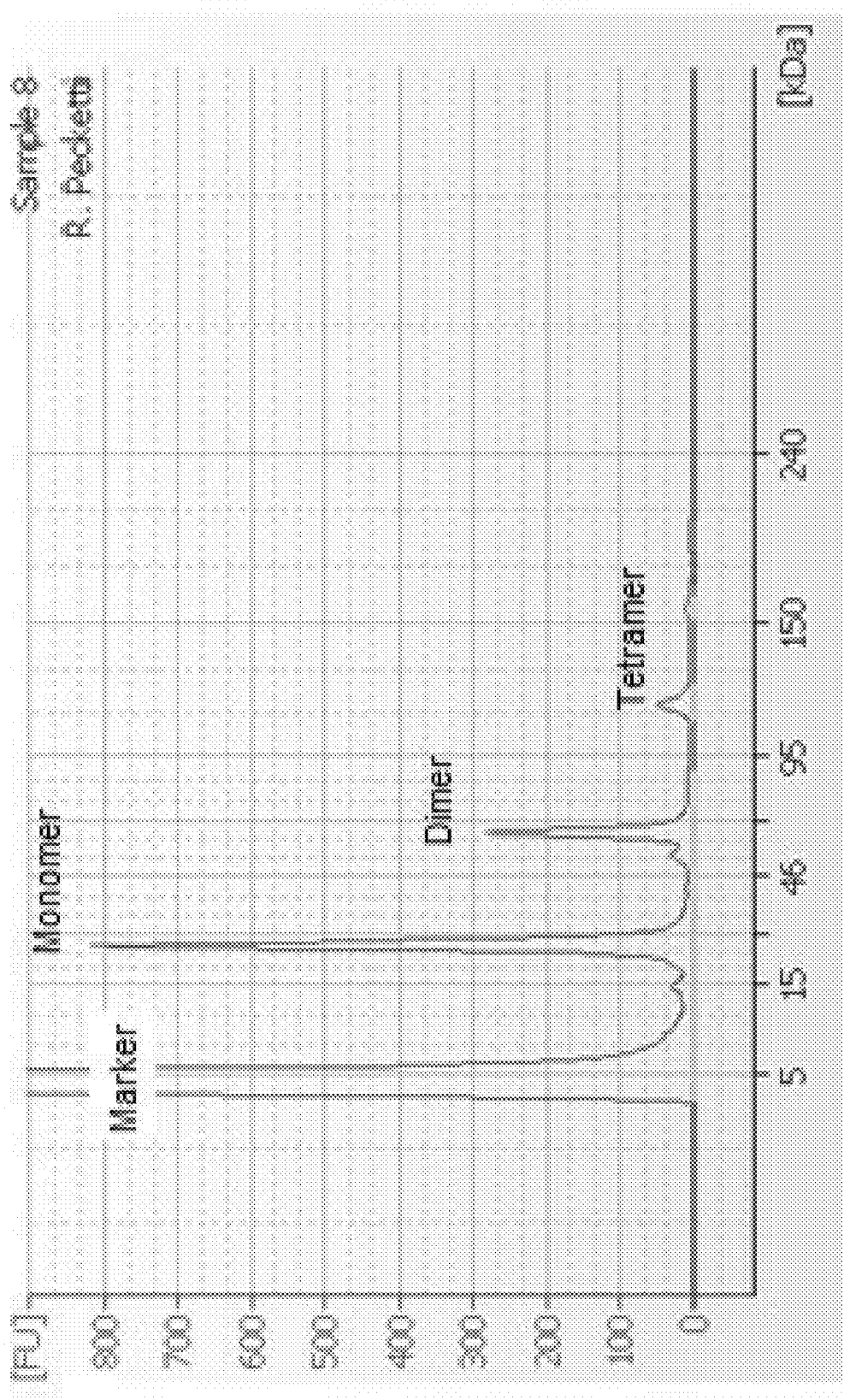
Figure 2C:
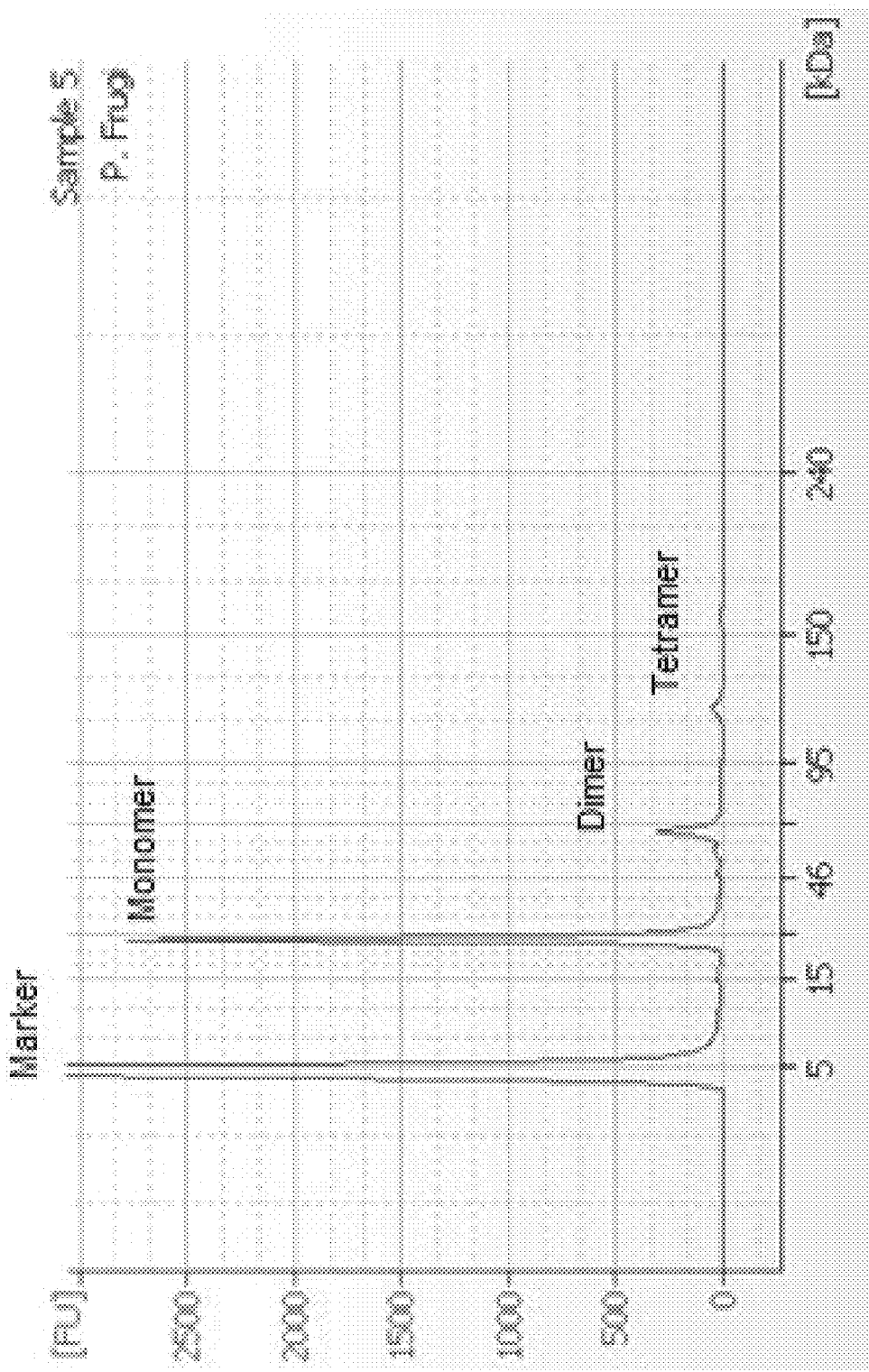
Figure 2D:
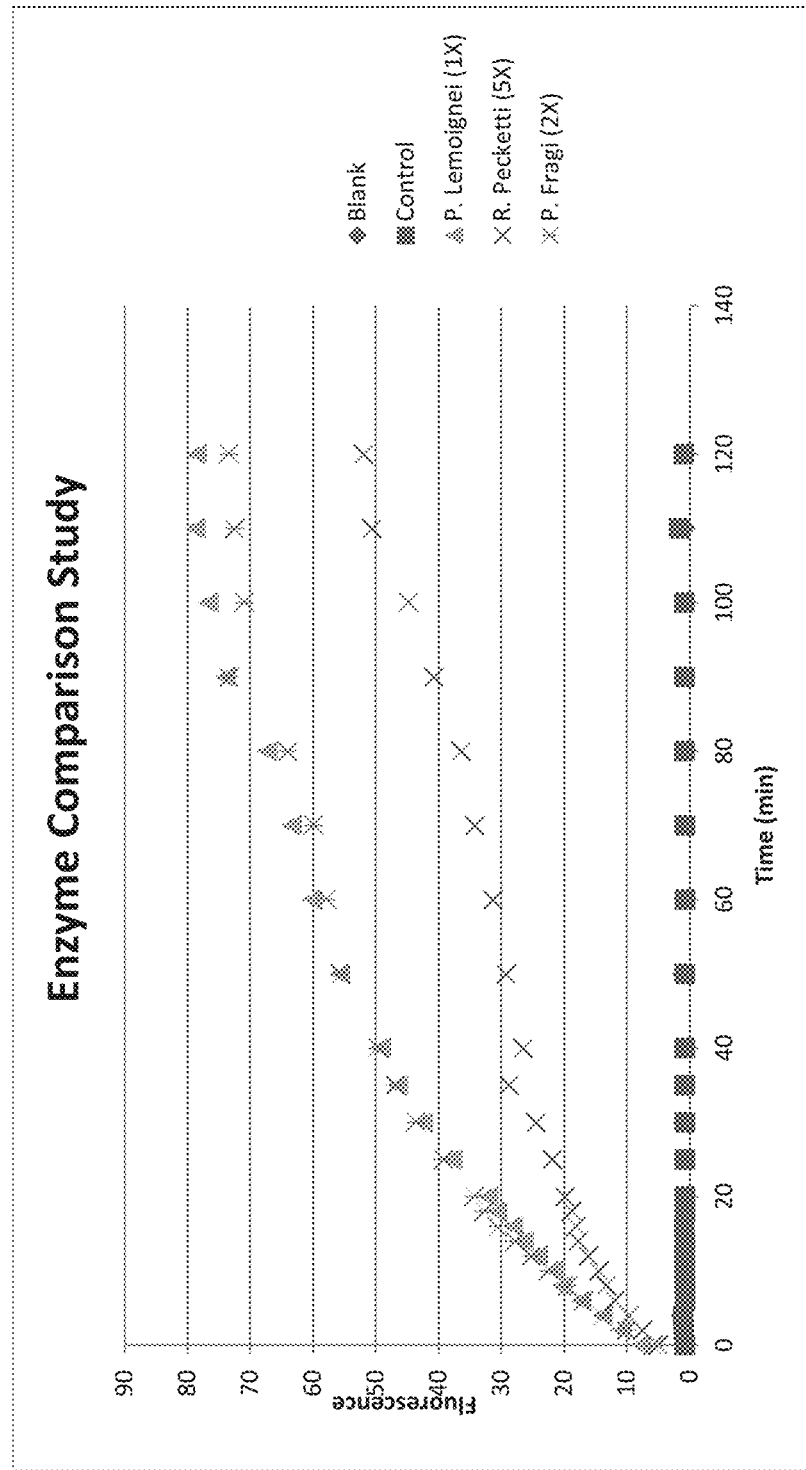

In studies of illustrative embodiments of 3HBD enzymes, *E. coli* (K12) optimized versions of genes encoding the Protein Sequence of 3HBD from *Ralstonia pickettii* T1 and the Protein Sequence of 3HBD from *Pseudomonas fragi* T1 (with carboxy terminal 8-His tags) were synthesized. These 3HBD encoding genes were subcloned into *E. coli* expression vectors and expressed in *E. Coli* strain Origami B. Expression studies determined that the cells transfected with these 3HDB clones showed vigorous growth, and that the plasmids were stable. Moreover, studies using SDS-polyacrylamide gels (FIG. 2A) showed that the recombinant products of 28 Kd were largely soluble. Capillary electrophoresis results (FIG. 2B) indicated that majority of the enzyme is monomeric. Enzymatic activities of these in enzymes compare favorably to another commercially available 3HBD isoform (3HDB from *Pseudomonas Lemoignei*, Sigma), with the results presented in FIG. 2C. In this context, artisans can use a wide variety of assays to examine, for example, the activities of different embodiments of 3HBD, assays such as those disclosed in Brashear et al., Anal Biochem. 1983 June; 131(2):478-82; U.S. Patent Application Publication Nos. 20180291354 and 20180346886, as well as commercially available kits such as the "Enzyme Activity Measurement of 3-Hydroxybutyrate Dehydrogenase Using Spectrophotometric Assays" sold by CREATIVE ENZYMES. These 3HBD enzyme embodiments in FIG. 2C were coated on the sensor architectures and tested. The 3HBD from *Pseudomonas fragi* appears to exhibit favorable stability for use with embodiments of the invention.

Embodiments of the invention can use a variety of 3-hydroxybutyrate dehydrogenase enzymes known in the art (see, e.g., Mountassif et al., Current Microbiology, Springer Verlag, 2010, 61 (1), pp. 7-12). Typically, the 3-hydroxybutyrate dehydrogenase enzyme is one obtained from *Pseudomonas lemoignei, Pseudomonas fragi* or *Ralstoni pickettii* (e.g., exhibits an at least a 90% sequence identity to 3-hydroxybutyrate dehydrogenase enzyme expressed by *Pseudomonas lemoignei, Pseudomonas fragi* or *Ralstoni pickettii*). In certain embodiments of the invention, the 3-hydroxybutyrate dehydrogenase enzyme comprises an amino acid sequence that exhibits an at least 90% or 95% sequence identity to SEQ ID NO: 1 or SEQ ID NO: 2 as disclosed in U.S. patent application Ser. No. 17/501,292, Filed on Oct. 14, 2021 and entitled: SENSORS FOR 3-HYDROXYBUTYRATE DETECTION, the contents of which are incorporated by reference. In certain embodiments of the invention, the 3-hydroxybutyrate dehydrogenase enzyme comprises an amino acid sequence that exhibits an at least 90% or 95% sequence identity to a 100 amino acid segment of SEQ ID NO: 1 or SEQ ID NO: 2 as disclosed in U.S. patent application Ser. No. 17/501,292.

Determinations of an at least a 90% or a 95% sequence identity can be conducted by conventional methods in the art. For example, the NCBI Homepage includes information such as: NCBI Bioinformatics Resources: An Introduction: BLAST: Compare & identify sequences. In this platform, a Basic Local Alignment Search Tool (BLAST) finds regions of similarity between sequences. The program compares nucleotide or protein sequences and calculates the statistical significance of matches. BLAST can be used to infer relationships between sequences. For example, BLASTp (Protein BLAST): compares one or more protein query sequences to a subject protein sequence or a database of protein sequences. In certain embodiments of the invention, the 3-hydroxybutyrate dehydrogenase enzyme comprises the amino acid sequence shown in SEQ ID NO: 1 or SEQ ID NO: 2 as disclosed in U.S. patent application Ser. No. 17/501,292.

The amperometric analyte sensor systems of the invention have a number of desirable constellations of elements. In certain amperometric analyte sensor systems of the invention, avidin is coupled to the electroactive material; biotin is coupled to nicotinamide adenine dinucleotide; the enzyme layer comprises avidin and nicotinamide adenine dinucleotide combined with 3-hydroxybutyrate dehydrogenase enzyme entrapped within a polymeric matrix comprising poly(vinyl alcohol) having styryl pyridinium side chains ("PVA-SBQ"); and an analyte modulating layer that, for example, comprises at least one of: a cellulose acetate polymer, a poly-2-hydroxyethyl methacrylate polymer, a polyurethane/polyurea polymer, a branched acrylate polymer or the like.

In embodiments of the invention, the 3-hydroxybutyrate electrode can be disposed within a piercing member adapted to contact interstitial fluids; and/or the 3-hydroxybutyrate electrode can comprise amounts of nicotinamide adenine dinucleotide molecules that are at least two-fold, five-fold or 10-fold greater than amounts of 3-hydroxybutyrate dehydrogenase enzyme molecules. In some embodiments of the invention, the amperometric analyte sensor system includes a processor; and a computer-readable program having instructions which cause the processor to assess signal data obtained from the 3-hydroxybutyrate electrode. In such embodiments, the 3-hydroxybutyrate electrode and the processor are operatively coupled so that the 3-hydroxybutyrate electrode monitors levels of 3-hydroxybutyrate present at the 3-hydroxybutyrate electrode; and the processor uses an algorithm to calculate a concentration of 3-hydroxybutyrate.

Embodiments of the invention include multimodal amperometric analyte sensor systems designed to monitor both 3-hydroxybutyrate and glucose. For example, embodiments of the invention include the 3-hydroxybutyrate sensing systems disclosed herein that further include a glucose sensing electrode, for example one comprising: a base formed from an electrically resistant material; a layer of an electroactive material disposed on the base; a layer of a glucose oxidase enzyme disposed on the electroactive material layer; and a glucose analyte modulating layer disposed over the layer of glucose oxidase enzyme and comprising a composition that modulates the diffusion of glucose through the glucose modulating layer. Such embodiments can further include a processor; and a computer-readable program having instructions which cause the processor to assess signal data obtained from the glucose electrode and the 3-hydroxybutyrate electrode; wherein: the glucose electrode and the processor are coupled so that the glucose electrode monitors levels of glucose present at the glucose electrode; the 3-hydroxybutyrate electrode and the processor are coupled so that the 3-hydroxybutyrate electrode monitors levels of 3-hydroxybutyrate present at the 3-hydroxybutyrate electrode; the processor uses a first algorithm to calculate a concentration of glucose; and the processor uses a second algorithm to calculate a concentration of 3-hydroxybutyrate.

Other embodiments of the invention include methods of making an amperometric analyte sensor electrode that estimates concentrations of 3-hydroxybutyrate. Typically such methods include the steps of forming a 3-hydroxybutyrate detecting electrode by: providing a base layer; forming conductive layer on the base layer, wherein the conductive layer includes an electroactive material; operatively coupling a 3-hydroxybutyrate dehydrogenase, a mediator and nicotinamide adenine dinucleotide to the electroactive material; and forming an analyte modulating layer disposed over the electroactive material, wherein the analyte modulating layer includes a composition that modulates the diffusion of 3-hydroxybutyrate therethrough; and also forming a contact pad for connecting an electrical conduit to the 3-hydroxybutyrate sensing electrode; so that the amperometric analyte sensor electrode is made. In certain of these methods, the 3-hydroxybutyrate electrode is further coated with at least one further layer of material, for example one comprising a layer comprising poly-1-lysine polymers having molecular weights between 30 KDa and 300 KDa, one comprising an interference rejection layer; one comprising a protein layer; one comprising an adhesion promoting layer or the like. Optionally these methods further comprise disposing the 3-hydroxybutyrate sensing electrode within a piercing member.

Related embodiments of the invention include methods of making an amperometric analyte sensor that estimates a concentration of glucose and a concentration of 3-hydroxybutyrate. Typically these methods comprise the steps of forming a glucose detecting electrode by providing a base layer; forming conductive layer on the base layer, wherein the conductive layer includes an electroactive material; forming an analyte sensing layer over the working electrode, wherein the analyte sensing layer comprises glucose oxidase; and forming an analyte modulating layer disposed over the analyte sensing layer, wherein the analyte modulating layer includes a composition that modulates the diffusion of glucose therethrough. These methods further include forming a 3-hydroxybutyrate detecting electrode by providing a base layer; forming conductive layer on the base layer, wherein the conductive layer includes an electroactive material; forming an analyte sensing layer over the working electrode, wherein the analyte sensing layer comprises 3-hydroxybutyrate dehydrogenase and nicotinamide adenine dinucleotide; and forming an analyte modulating layer disposed over the analyte sensing layer, wherein the analyte modulating layer includes a composition that modulates the diffusion of 3-hydroxybutyrate therethrough; and then forming contact pad(s) for connecting an electrical conduit to the glucose sensing electrode and the 3-hydroxybutyrate sensing electrode; so that the amperometric analyte sensor is made.

Embodiments of the invention further include methods of estimating the concentrations of 3-hydroxybutyrate in vivo. The methods are adapted to continuously sense 3-hydroxybutyrate for a period of time (e.g., at least one 1 hour, at least 1, 2 or 3 days etc.). Typically, these methods include disposing an amperometric analyte sensor system disclosed herein into an in vivo environment of a subject (e.g., one diagnosed with ketoacidosis or diabetes), wherein the environment comprises 3-hydroxybutyrate; and estimating the concentration of 3-hydroxybutyrate; so that the concentrations of 3-hydroxybutyrate in vivo are estimated. In embodiments of the invention comprising multimodality sensor systems, these methods include disposing both the glucose sensing and the 3-hydroxybutyrate sensing electrode in vivo (e.g., within an interstitial space); and then estimating the concentrations of 3-hydroxybutyrate and glucose in vivo. FIGS. 9A-9D show data from studies on the functionality of embodiments of the invention.

In typical embodiments, the glucose working electrode and the 3-hydroxybutyrate working electrode of the amperometric analyte sensor system is coated with a plurality of layered materials including an analyte sensing layer comprising an enzyme that produces a sensible product the presence of analyte (e.g., the enzyme glucose oxidase or the enzyme 3-hydroxybutyrate dehydrogenase). These electrodes in the sensor can also be coated with other layers such as an NAD barrier layer, an interference rejection layer, a protein layer, an adhesion promoting layer and/or an analyte modulating layer comprising a composition that modulates the diffusion of an analyte diffusing therethrough. The electrodes in such systems can be formed from a wide variety of materials and disposed in a variety of configurations. For example, these electrodes can be made of, but not limited to, the following materials or combination of materials: carbon (e.g., carbon paste electrodes), metals (e.g., platinum, palladium, ruthenium, osmium); metal oxides (e.g., iridium oxide, silver oxide, tin oxide); polymers and conducting polymers (e.g. ionophores, polypyrrole, polyaniline); and/or hydrogels (e.g. polyacrylic acid, chitosan with backbone functionalized with acidic or basic groups). The electrodes can be arranged and configured in multiple ways: including as a part of a sensing system; distributed along sensor probe; parallel to other analyte sensing electrodes; above or below other analyte sensing electrodes; on one or both sides of a 360-degree sensing probe; as part of a wire based electrode configuration and/or multiple and individually addressed electrodes on any of the above mentioned configurations.

A wide variety of materials can be used to entrap elements of the invention and/or modulate the diffusion of molecules in or out of, or otherwise within the sensor. Illustrative materials include, for example, cellulose acetate polymers, poly-2-hydroxyethyl methacrylate polymers, polyurethane/polyurea polymers, branched acrylate polymers, hexamethyldisiloxane (HMDSO) polymers, parylene-C polymers, and the like. In certain embodiments of the invention, a layer such as the analyte modulating layer comprises a linear polyurethane/polyurea polymer. Typically, the analyte modulating layer is formed from a mixture comprising: a diisocyanate compound (typically about 50 mol % of the reactants in the mixture); at least one hydrophilic diol or hydrophilic diamine compound (typically about 17 to 45 mol % of the reactants in the mixture); and a siloxane compound. Optionally the polyurethane/polyurea polymer comprises 45-55 mol % (e.g., 50 mol %) of a diisocyanate (e.g. 4,4'-diisocyanate), 10-20 (e.g. 12.5 mol %) mol % of a siloxane (e.g., polymethylhydrosiloxane, trimethylsilyl terminated), and 30-45 mol % (e.g. 37.5 mol %) of a hydrophilic diol or hydrophilic diamine compound (e.g. polypropylene glycol diamine having an average molecular weight of 600 Daltons, and a JEFFAMINE such as JEFFAMINE 600). In this context, artisans understand that JEFFAMINES comprise T-series polyetheramine products that are typically triamines based on trifunctional PPG backbones. In certain embodiments of the analyte modulating layer a first polyurethane/polyurea polymer is blended with a second polymer formed from a mixture comprising: 5-45 weight % of a 2-(dimethylamino)ethyl methacrylate compound; 15-55 weight % of a methyl methacrylate compound; 15-55 weight % of a polydimethyl siloxane monomethacryloxypropyl compound; 5-35 weight % of a poly(ethylene oxide) methyl ether methacrylate compound; and 1-20 weight % 2-hydroxyethyl methacrylate, with the first polymer and the second polymer blended together at a ratio between 1:1 and 1:20 weight %.

In some embodiments of the invention, the analyte modulating layer can comprise a blended mixture of a polyurethane/polyurea polymer formed from a mixture comprising a diisocyanate; a hydrophilic polymer comprising a hydrophilic diol or hydrophilic diamine; and a siloxane having an amino, hydroxyl or carboxylic acid functional group at a terminus. Optionally this polyurethane/polyurea polymer is blended with a branched acrylate polymer formed from a mixture comprising a butyl, propyl, ethyl or methyl-acrylate; an amino-acrylate; a siloxane-acrylate; and a poly(ethylene oxide)-acrylate. Optionally the analyte modulating layer exhibits a water adsorption profile of 40-60% of membrane weight. In certain embodiments of the invention, the analyte modulating layer is 5-15 um thick. In some embodiments, the analyte modulating layer comprises a polyurethane/polyurea polymer formed from a mixture comprising: a diisocyanate; a hydrophilic polymer comprising a hydrophilic diol or hydrophilic diamine; a siloxane having an amino, hydroxyl or carboxylic acid functional group at a terminus; and a polyurethane/polyurea polymer stabilizing compound selected for its ability to inhibit thermal and oxidative degradation of polyurethane/polyurea polymers formed from the mixture, wherein the polyurethane/polyurea polymer stabilizing compound has a molecular weight of less than 1000 g/mol; and comprises a benzyl ring having a hydroxyl moiety (ArOH). In typical embodiments of the invention, the polyurethane/polyurea polymer stabilizing compound exhibits an antioxidant activity (e.g., embodiments that comprise phenolic antioxidants). Optionally, the polyurethane/polyurea polymer stabilizing compound comprises at least two benzyl rings having a hydroxyl moiety.

Illustrative Sensor Components and Systems of the Invention

Figure 4:
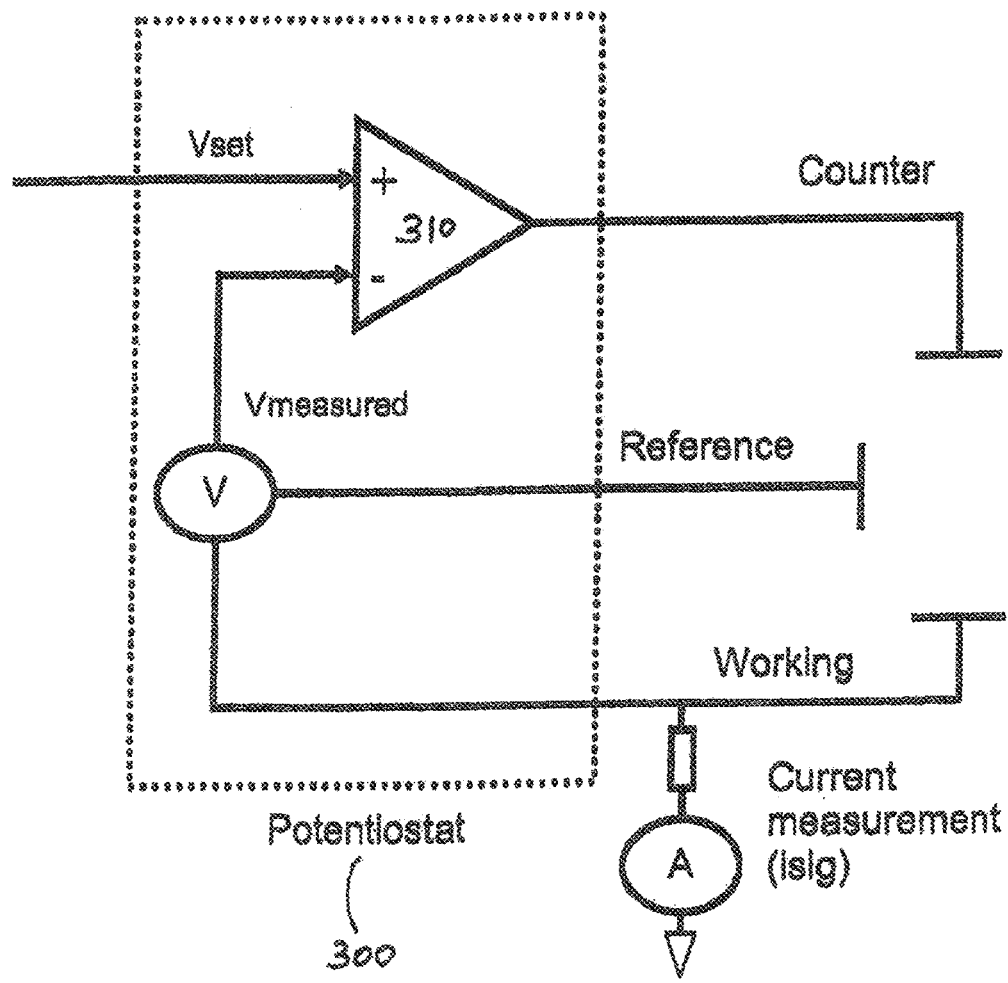
FIG. 4 shows a schematic of a potentiostat that may be used to measure current in embodiments of the present invention.

In typical embodiments of the invention, electrochemical sensors are operatively coupled to a sensor input capable of receiving signals from the electrochemical sensor; and a processor coupled to the sensor input, wherein the processor is capable of characterizing one or more signals received from the electrochemical sensor. In certain embodiments of the invention, the electrical conduit of the electrode is coupled to a potentiostat (see e.g., FIG. 4). Optionally, a pulsed voltage is used to obtain a signal from an electrode. In certain embodiments of the invention, the processor is capable of comparing a first signal received from a working electrode in response to a first working potential with a second signal received from a working electrode in response to a second working potential. Optionally, the electrode is coupled to a processor adapted to convert data obtained from observing fluctuations in electrical current from a first format into a second format. Such embodiments include, for example, processors designed to convert a sensor current Input Signal (e.g., ISIG measured in nA) to a blood glucose concentration.

In many embodiments of the invention, the sensors comprise a biocompatible region adapted to be implanted in vivo. In some embodiments, the sensor comprises a discreet probe that pierces an in vivo environment. In embodiments of the invention, the biocompatible region can comprise a polymer that contacts an in vivo tissue. Optionally, the polymer is a hydrophilic polymer (e.g., one that absorbs water). In this way, sensors used in the systems of the invention can be used to sense a wide variety of analytes in different aqueous environments. In some embodiments of the invention, the electrode is coupled to a piercing member (e.g., a needle) adapted to be implanted in vivo. While sensor embodiments of the invention can comprise one or two piercing members, optionally such sensor apparatuses can include 3 or 4 or 5 or more piercing members that are coupled to and extend from a base element and are operatively coupled to 3 or 4 or 5 or more electrochemical sensors (e.g. microneedle arrays, embodiments of which are disclosed for example in U.S. Pat. Nos. 7,291,497 and 7,027,478, and U.S. patent Application No. 20080015494, the contents of which are incorporated by reference).

Embodiments of the invention include analyte sensor apparatus designed to utilize the compositions disclosed herein. Such apparatuses typically include a base on which an electrode is formed (e.g., an array of electrically conductive members configured to form a working electrode). Optionally this base comprises a plurality of indentations and the plurality of electrically conductive members are individually positioned within the plurality of indentations and the electrically conductive members comprise an electroactive surface adapted to sense fluctuations in electrical current at the electroactive surface.

In some embodiments of the invention where an electrode is formed from an array of electrically conductive members, the plurality of electrically conductive members is formed from shapes selected to avoid sharp edges and corners, electrode structures where electric charges can accumulate. In typical embodiments of the invention, the electrically conductive members can be formed to exhibit an ellipsoid geometry. For example, in some embodiments of the invention, the electrically conductive members comprise ellipses, circular discs, or combinations of ellipses and circular discs. Typically, such electrically conductive members are formed to have a diameter of at least 1 µm, for example, a diameter from 1 µm to 100 µm (e.g., circular discs having a diameter of 30, 40 or 50 µm). Optionally, the array comprises at least 5, 10, 20, 50 or 100 electrically conductive members.

In some embodiments of the invention, the array of electrically conductive members is coupled to a common electrical conduit (e.g., so that the conductive members of the array are not separately wired and are instead electrically linked as a group). Optionally, the electrical conduit is coupled to a power source adapted to sense fluctuations in electrical current of the array of the working electrode. Typically, the apparatus includes a reference electrode; and a counter electrode. Optionally one or more of these electrodes also comprises a plurality of electrically conductive members disposed on the base in an array. In some embodiments, each of the electrically conductive members of the electrode (e.g., the counter electrode) comprises an electroactive surface adapted to sense fluctuations in electrical current at the electroactive surface; and the group of electrically conductive members are coupled to a power source (e.g., a potentiostat or the like).

In some embodiments of the invention, the apparatus comprises a plurality of working electrodes, counter electrodes and reference electrodes clustered together in units consisting essentially of one working electrode, one counter electrode and one reference electrode; and the clustered units are longitudinally distributed on the base layer in a repeating pattern of units. In some sensor embodiments, the distributed electrodes are organized/disposed within a flex-circuit assembly (i.e., a circuitry assembly that utilizes flexible rather than rigid materials). Such flex-circuit assembly embodiments provide an interconnected assembly of elements (e.g., electrodes, electrical conduits, contact pads and the like) configured to facilitate wearer comfort (for example by reducing pad stiffness and wearer discomfort).

Typically, the sensor electrodes of the invention are coated with a plurality of materials having properties that, for example, facilitate analyte sensing. In some embodiments of the invention, an analyte sensing layer is disposed over electrically conductive members and includes an agent that is selected for its ability to detectably alter the electrical current at the working electrode in the presence of an analyte. In the working embodiments of the invention that are disclosed herein, the agent is glucose oxidase, a protein that undergoes a chemical reaction in the presence of glucose that results in an alteration in the electrical current at the working electrode. These working embodiments further include an analyte modulating layer disposed over the analyte sensing layer, wherein the analyte modulating layer modulates the diffusion of glucose as it migrates from an in vivo environment to the analyte sensing layer. In certain embodiments of the invention, the analyte modulating layer comprises a hydrophilic comb-copolymer having a central chain and a plurality of side chains coupled to the central chain, wherein at least one side chain comprises a silicone moiety. In certain embodiments of the invention, the analyte modulating layer comprises a blended mixture of a linear polyurethane/polyurea polymer, and a branched acrylate polymer; and the linear polyurethane/polyurea polymer and the branched acrylate polymer are blended at a ratio of between 1:1 and 1:20 (e.g., 1:2) by weight %. Typically, this analyte modulating layer composition comprises a first polymer formed from a mixture comprising a diisocyanate; at least one hydrophilic diol or hydrophilic diamine; and a siloxane; that is blended with a second polymer formed from a mixture comprising: a 2-(dimethylamino) ethyl methacrylate; a methyl methacrylate; a polydimethyl siloxane monomethacryloxypropyl; a poly(ethylene oxide) methyl ether methacrylate; and a 2-hydroxyethyl methacrylate. Additional material layers can be included in such apparatuses. For example, in some embodiments of the invention, the apparatus comprises an adhesion promoting layer disposed between the analyte sensing layer and the analyte modulating layer.

Embodiments of the invention include dry plasma processes form making adhesion promoting (AP) layers in sensors comprising a plurality of layered materials (see, e.g., International Patent Application No. PCT/US2013/049138). The dry plasma processes disclosed PCT/US2013/049138 have a number of advantages over conventional wet chemistry processes used to form adhesion promoting layers, including reducing and/or eliminating the use of certain hazardous compounds, thereby reducing toxic wastes that can result from such processes. Embodiments of the invention also include adhesion promoting compositions formed from these processes, compositions that exhibit a combination of desirable material properties including relatively thin and highly uniform structural profiles.

Figure 1D:
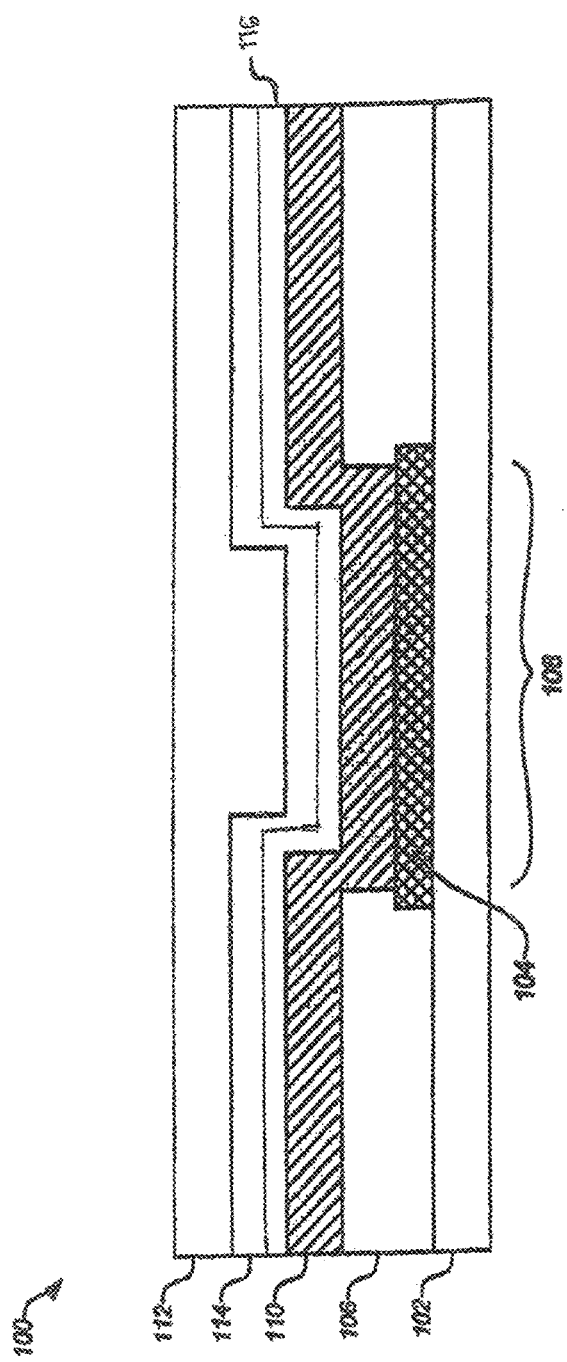

FIGS. 1A-1E provide schematics showing illustrative configurations for sensor electrodes formed from a plurality of planar layered elements. In some embodiments of the invention, the layers are organized so that an analyte sensing layer is disposed over a conductive layer and the adhesion promoting layer disposed over the analyte sensing layer. One sensor embodiment shown in FIG. 1D is an amperometric sensor 100 having a plurality of layered elements including a base layer 102, a conductive layer 104 (e.g., one comprising the plurality of electrically conductive members) which is disposed on and/or combined with the base layer 102. Typically, the conductive layer 104 comprises one or more electrodes. An analyte sensing layer 110 (typically comprising an enzyme such as glucose oxidase) is disposed on one or more of the exposed electrodes of the conductive layer 104. A protein layer 116 disposed upon the analyte sensing layer 110. An analyte modulating layer 112 is disposed above the analyte sensing layer 110 to regulate analyte (e.g., glucose) access with the analyte sensing layer 110. An adhesion promoter layer 114 is disposed between layers such as the analyte modulating layer 112 and the analyte sensing layer 110 as shown in FIG. 1D in order to facilitate their contact and/or adhesion. This embodiment also comprises a cover layer 106 such as a polymer coating can be disposed on portions of the sensor 100. Apertures 108 can be formed in one or more layers of such sensors. Amperometric glucose sensors having this type of design are disclosed, for example, in U.S. Patent Application Publication Nos. 20070227907, 20100025238, 20110319734 and 20110152654, the contents of each of which are incorporated herein by reference.

Embodiments of the invention also provide articles of manufacture and kits for observing a concentration of an analyte. In an illustrative embodiment, the kit includes a sensor comprising a composition as disclosed herein. In typical embodiments, the sensors are disposed in the kit within a sealed sterile dry package. Optionally the kit comprises an insertion device that facilitates insertion of the sensor. The kit and/or sensor set typically comprises a container, a label and an analyte sensor as described above. Suitable containers include, for example, an easy to open package made from a material such as a metal foil, bottles, vials, syringes, and test tubes. The containers may be formed from a variety of materials such as metals (e.g., foils) paper products, glass or plastic. The label on, or associated with, the container indicates that the sensor is used for assaying the analyte of choice. The kit and/or sensor set may include other materials desirable from a commercial and user standpoint, including buffers, diluents, filters, needles, syringes, and package inserts with instructions for use.

Specific aspects of embodiments of the invention are discussed in detail in the following sections.

Figure 1E:
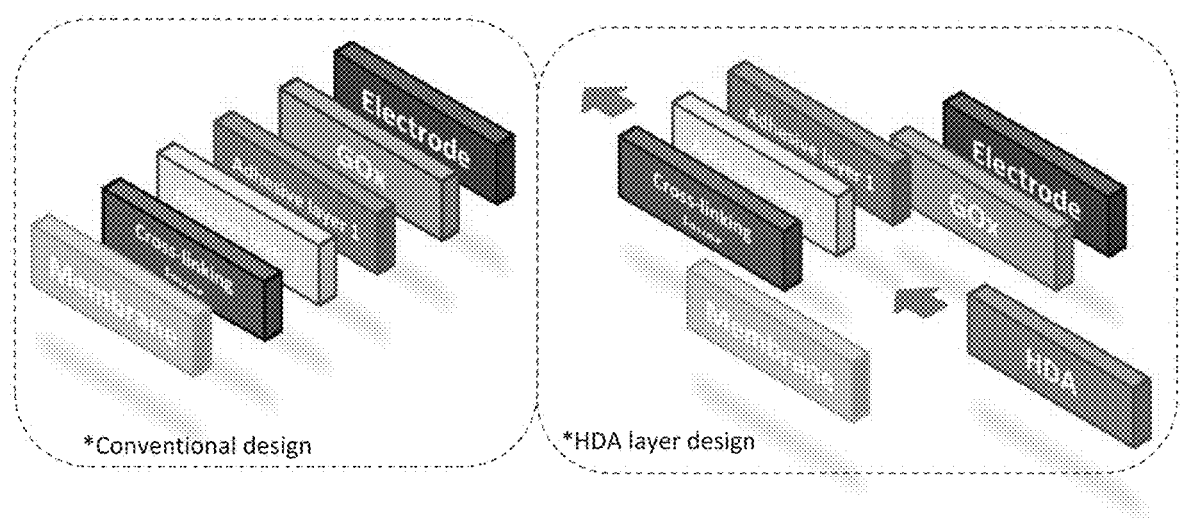

Typical Elements, Configurations and Analyte Sensor Embodiments of the Invention A. Typical Elements Found in of Embodiments of the Invention FIG. 1D illustrates a cross-section of a conventional sensor embodiment 100. The components of the sensor are typically characterized herein as layers in this layered electrochemical sensor stack because, for example, it allows for a facile characterization of conventional sensor structures such as those shown in FIG. 1D and their differences from another embodiment of the invention disclosed herein as shown in FIG. 1E (i.e., ones comprising a HDA layer). Artisans will understand, that in certain embodiments of the invention, the sensor constituents are combined such that multiple constituents form one or more heterogeneous layers. Those of skill in this art will understand that certain embodiments if the invention include materials and/or elements/layers that are found in conventional sensors while others are excluded, and/or new material layers/elements are included. For example, certain elements disclosed in FIG. 1D are also found in the invention disclosed herein (e.g., a base, analyte sensing layer, an analyte modulating layer etc.) while, as shown in FIG. 1E, other elements are not (e.g., separate HSA protein layers, layers comprising a siloxane adhesion promoter etc.). Similarly, embodiments of the invention include layers/elements having materials disposed in unique configurations that are not found in conventional sensors (e.g., high-density amine (HDA) polymer layers).

The conventional embodiment shown in FIG. 1D includes a base layer 102 to support the sensor 100. The base layer 102 can be made of a material such as a metal and/or a ceramic and/or a polymeric substrate, which may be self-supporting or further supported by another material as is known in the art. Embodiments can include a conductive layer 104 which is disposed on and/or combined with the base layer 102. Typically, the conductive layer 104 comprises one or more electrically conductive elements that function as electrodes. An operating sensor 100 typically includes a plurality of electrodes such as a working electrode, a counter electrode and a reference electrode. Other embodiments may also include a plurality of working and/or counter and/or reference electrodes and/or one or more electrodes that performs multiple functions, for example one that functions as both as a reference and a counter electrode.

As discussed in detail below, the base layer 102 and/or conductive layer 104 can be generated using many known techniques and materials. In certain embodiments of the invention, the electrical circuit of the sensor is defined by etching the disposed conductive layer 104 into a desired pattern of conductive paths. A typical electrical circuit for the sensor 100 comprises two or more adjacent conductive paths with regions at a proximal end to form contact pads and regions at a distal end to form sensor electrodes. An electrically insulating cover layer 106 such as a polymer coating can be disposed on portions of the sensor 100. Acceptable polymer coatings for use as the insulating protective cover layer 106 can include, but are not limited to, non-toxic biocompatible polymers such as silicone compounds, polyimides, biocompatible solder masks, epoxy acrylate copolymers, or the like. In the sensors of the present invention, one or more exposed regions or apertures 108 can be made through the cover layer 106 to open the conductive layer 104 to the external environment and to, for example, allow an analyte such as glucose to permeate the layers of the sensor and be sensed by the sensing elements. Apertures 108 can be formed by a number of techniques, including laser ablation, tape masking, chemical milling or etching or photolithographic development or the like. In certain embodiments of the invention, during manufacture, a secondary photoresist can also be applied to the protective layer 106 to define the regions of the protective layer to be removed to form the aperture(s) 108. The exposed electrodes and/or contact pads can also undergo secondary processing (e.g., through the apertures 108), such as additional plating processing, to prepare the surfaces and/or strengthen the conductive regions.

In the sensor configuration shown in FIG. 1D, an analyte sensing layer 110 is disposed on one or more of the exposed electrodes of the conductive layer 104. Typically, the analyte sensing layer 110 comprises an enzyme capable of producing and/or utilizing oxygen and/or hydrogen peroxide (for example glucose oxidase). Optionally the enzyme in the analyte sensing layer is combined with a carrier protein such as human serum albumin, bovine serum albumin or the like. In an illustrative embodiment, an oxidoreductase enzyme such as glucose oxidase in the analyte sensing layer 110 reacts with glucose to produce hydrogen peroxide, a compound which then modulates a current at an electrode. As this modulation of current depends on the concentration of hydrogen peroxide, and the concentration of hydrogen peroxide correlates to the concentration of glucose, the concentration of glucose can be determined by monitoring this modulation in the current. In a specific embodiment of the invention, the hydrogen peroxide is oxidized at a working electrode which is an anode (also termed herein the anodic working electrode), with the resulting current being proportional to the hydrogen peroxide concentration. Such modulations in the current caused by changing hydrogen peroxide concentrations can by monitored by any one of a variety of sensor detector apparatuses such as a universal sensor amperometric biosensor detector or one of the other varieties of similar devices known in the art such as glucose monitoring devices produced by Medtronic Diabetes.

In embodiments of the invention, the analyte sensing layer 110 can be applied over portions of the conductive layer or over the entire region of the conductive layer. Typically, the analyte sensing layer 110 is disposed on the working electrode which can be the anode or the cathode. Optionally, the analyte sensing layer 110 is also disposed on a counter and/or reference electrode. Methods for generating a thin analyte sensing layer 110 include brushing the layer onto a substrate (e.g., the reactive surface of a platinum black electrode), as well as spin coating processes, dip and dry processes, low shear spraying processes, ink-jet printing processes, silk screen processes and the like. In certain embodiments of the invention, brushing is used to: (1) allow for a precise localization of the layer; and (2) push the layer deep into the architecture of the reactive surface of an electrode (e.g., platinum black produced by an electrodeposition process).

Typically, the analyte sensing layer 110 is coated and or disposed next to one or more additional layers. Optionally, the one or more additional layers includes a protein layer 116 disposed upon the analyte sensing layer 110. Typically, the protein layer 116 comprises a protein such as human serum albumin, bovine serum albumin or the like. Typically, the protein layer 116 comprises human serum albumin. In some embodiments of the invention, an additional layer includes an analyte modulating layer 112 that is disposed above the analyte sensing layer 110 to regulate analyte contact with the analyte sensing layer 110. For example, the analyte modulating membrane layer 112 can comprise a glucose limiting membrane, which regulates the amount of glucose that contacts an enzyme such as glucose oxidase that is present in the analyte sensing layer. Such glucose limiting membranes can be made from a wide variety of materials known to be suitable for such purposes, e.g., silicone compounds such as polydimethyl siloxanes, polyurethanes, polyurea cellulose acetates, Nafion, polyester sulfonic acids (e.g., Kodak AQ), hydrogels or any other suitable hydrophilic membranes known to those skilled in the art.

In typical embodiments of the invention, an adhesion promoter layer 114 is disposed between the analyte modulating layer 112 and the analyte sensing layer 110 as shown in FIG. 1D in order to facilitate their contact and/or adhesion. In a specific embodiment of the invention, an adhesion promoter layer 114 is disposed between the analyte modulating layer 112 and the protein layer 116 as shown in FIG. 1D in order to facilitate their contact and/or adhesion. The adhesion promoter layer 114 can be made from any one of a wide variety of materials known in the art to facilitate the bonding between such layers. Typically, the adhesion promoter layer 114 comprises a silane compound. In alternative embodiments, protein or like molecules in the analyte sensing layer 110 can be sufficiently crosslinked or otherwise prepared to allow the analyte modulating membrane layer 112 to be disposed in direct contact with the analyte sensing layer 110 in the absence of an adhesion promoter layer 114.

B. Typical Analyte Sensor Constituents Used in Embodiments of the Invention

The following disclosure provides examples of typical elements/constituents used in sensor embodiments of the invention. While these elements can be described as discreet units (e.g. layers), those of skill in the art understand that sensors can be designed to contain elements having a combination of some or all of the material properties and/or functions of the elements/constituents discussed below (e.g. an element that serves both as a supporting base constituent and/or a conductive constituent and/or a matrix for the analyte sensing constituent and which further functions as an electrode in the sensor). Those in the art understand that these thin film analyte sensors can be adapted for use in a number of sensor systems such as those described below.

Base Constituent

Sensors of the invention typically include a base constituent (see, e.g., element 102 in FIG. 1D). The term "base constituent" is used herein according to art accepted terminology and refers to the constituent in the apparatus that typically provides a supporting matrix for the plurality of constituents that are stacked on top of one another and comprise the functioning sensor. In one form, the base constituent comprises a thin film sheet of insulative (e.g., electrically insulative and/or water impermeable) material. This base constituent can be made of a wide variety of materials having desirable qualities such as dielectric properties, water impermeability and hermeticity. Some materials include metallic, and/or ceramic and/or polymeric substrates or the like.

Conductive Constituent

The electrochemical sensors of the invention typically include a conductive constituent disposed upon the base constituent that includes at least one electrode having an electroactive material that contacts an analyte or its byproduct (e.g., oxygen and/or hydrogen peroxide) to be assayed (see, e.g., element 104 in FIG. 1D). The term "conductive constituent" is used herein according to art accepted terminology and refers to electrically conductive sensor elements such as a plurality of electrically conductive members disposed on the base layer (e.g., so as to form a microarray electrode) and which are capable of measuring a detectable signal and conducting this to a detection apparatus. An illustrative example of this is a conductive constituent that forms a working electrode that can measure an increase or decrease in current in response to exposure to a stimuli such as the change in the concentration of an analyte or its byproduct as compared to a reference electrode that does not experience the change in the concentration of the analyte, a coreactant (e.g. oxygen) used when the analyte interacts with a composition (e.g. the enzyme glucose oxidase) present in analyte sensing constituent 110 or a reaction product of this interaction (e.g. hydrogen peroxide). Illustrative examples of such elements include electrodes which are capable of producing variable detectable signals in the presence of variable concentrations of molecules such as hydrogen peroxide or oxygen.

In addition to the working electrode and the working electrode, the analyte sensors of the invention typically include a reference electrode or a combined reference and counter electrode (also termed a quasi-reference electrode or a counter/reference electrode). If the sensor does not have a counter/reference electrode then it may include a separate counter electrode, which may be made from the same or different materials as the working electrodes. Typical sensors of the present invention have one or more working electrodes and one or more counter, reference, and/or counter/reference electrodes. One embodiment of the sensor of the present invention has two, three or four or more working electrodes. These working electrodes in the sensor may be integrally connected or they may be kept separate. Optionally, the electrodes can be disposed on a single surface or side of the sensor structure. Alternatively, the electrodes can be disposed on a multiple surfaces or sides of the sensor structure (and can for example be connected by vias through the sensor material(s) to the surfaces on which the electrodes are disposed). In certain embodiments of the invention, the reactive surfaces of the electrodes are of different relative areas/sizes, for example a 1× reference electrode, a 2.6× working electrode and a 3.6× counter electrode.

Interference Rejection Constituent

The electrochemical sensors of the invention optionally include an interference rejection constituent disposed between the surface of the electrode and the environment to be assayed. In particular, certain sensor embodiments rely on the oxidation and/or reduction of hydrogen peroxide generated by enzymatic reactions on the surface of a working electrode at a constant potential applied. Because amperometric detection based on direct oxidation of hydrogen peroxide requires a relatively high oxidation potential, sensors employing this detection scheme may suffer interference from oxidizable species that are present in biological fluids such as ascorbic acid, uric acid and acetaminophen. In this context, the term "interference rejection constituent" is used herein according to art accepted terminology and refers to a coating or membrane in the sensor that functions to inhibit spurious signals generated by such oxidizable species which interfere with the detection of the signal generated by the analyte to be sensed. Certain interference rejection constituents function via size exclusion (e.g., by excluding interfering species of a specific size). Examples of interference rejection constituents include one or more layers or coatings of compounds such as hydrophilic polyurethanes, cellulose acetate (including cellulose acetate incorporating agents such as poly(ethylene glycol), polyethersulfones, polytetra-fluoroethylenes, the perfluoronated ionomer Nafion™, polyphenylenediamine, epoxy and the like.

Analyte Sensing Constituent

The electrochemical sensors of the invention include an analyte sensing constituent disposed on the electrodes of the sensor (see, e.g., element 110 in FIG. 1D). In working embodiments of the invention disclosed herein, this constituent comprises 3-hydroxybutyrate dehydrogenase (e.g., SEQ ID NO: 1 or SEQ ID NO: 2 as disclosed in U.S. patent application Ser. No. 17/501,292) and/or glucose oxidase. The term "analyte sensing constituent" is used herein according to art accepted terminology and refers to a constituent comprising a material that is capable of recognizing or reacting with an analyte whose presence is to be detected by the analyte sensor apparatus. Typically, this material in the analyte sensing constituent produces a detectable signal after interacting with the analyte to be sensed, typically via the electrodes of the conductive constituent. In this regard the analyte sensing constituent and the electrodes of the conductive constituent work in combination to produce the electrical signal that is read by an apparatus associated with the analyte sensor. Typically, the analyte sensing constituent comprises an enzyme capable of reacting with and/or producing a molecule whose change in concentration can be measured by measuring the change in the current at an electrode of the conductive constituent, for example the enzymes 3HBD or glucose oxidase. An enzyme capable of producing a molecule such as hydrogen peroxide can be disposed on the electrodes according to a number of processes known in the art. The analyte sensing constituent can coat all or a portion of the various electrodes of the sensor. In this context, the analyte sensing constituent may coat the electrodes to an equivalent degree. Alternatively, the analyte sensing constituent may coat different electrodes to different degrees, with for example the coated surface of the working electrode being larger than the coated surface of the counter and/or reference electrode.

Embodiments of the invention comprise analyte modulating layers formed from PVA-SbQ polymers having selected molecular weights and constituent ratios. In general, the structure of the PVA-SbQ materials useful in analyte sensors is one that is dense and stable enough to maintain its integrity over the time in aqueous medium (e.g., in vivo). Low molecular weight "LMW" PVA having a molecular weight range of 31 to 50 kDa can be purchased commercially (e.g., Aldrich #36313-8) as well as high molecular weight "HMW" PVA having a molecular weight range from 85 to 146 kDa (of (Aldrich #36314-6). PVA-SbQ methods and materials are known in the art (see, e.g., U.S. Pat. Nos. 7,638,157, 7,415,299 and 6,379,883, US Patent Publication Nos. 20190094169 and 20170311858 and Ichimura et al., Journal of Polymer Science Part A: Polymer Chemistry, Volume 50, Issue 19, pages 4094-4102 (2012)). For example, as is known in the art, PVA can be acetalized with N-methyl-4-(p-formyl styryl) Pyridinium methosulfate (SbQ). Photosensitive compound, 1-methyl-4-[2-(4-diethylacetylphenyl) ethenyl] pridininm methosulfate (SbQ-A salt), can be synthesized from dimethyl sulfate, terephthalaldehyde mono-(diethylacetal) and 4-picoline. SbQ-A salts can be reacted with poly (vinyl alcohol)s, (PVA) in aqueous solution with phosphoric acid as catalyst to give photosensitive PVA-SbQ with different SbQ content and molecular weights.

Some sensor embodiments of this element of the invention utilize an enzyme (e.g., 3-hydroxybutyrate dehydrogenase and/or glucose oxidase) that has been optionally combined with a second protein (e.g., albumin) in a fixed ratio (e.g. one that is typically optimized for glucose oxidase stabilizing properties) and then applied on the surface of an electrode to form a thin enzyme constituent. In a typical embodiment, the analyte sensing constituent comprises a GOx and HSA mixture.

As noted above, in some embodiments of the invention, the enzyme and the second protein (e.g., an albumin) can be treated to form a crosslinked matrix (e.g., by adding a cross-linking agent to the protein mixture). As is known in the art, crosslinking conditions may be manipulated to modulate factors such as the retained biological activity of the enzyme, its mechanical and/or operational stability. Illustrative crosslinking procedures are described in U.S. patent application Ser. No. 10/335,506 and PCT publication WO 03/035891 which are incorporated herein by reference. For example, an amine cross-linking reagent, such as, but not limited to, glutaraldehyde, can be added to the protein mixture. The addition of a cross-linking reagent to the protein mixture creates a protein paste. The concentration of the cross-linking reagent to be added may vary according to the concentration of the protein mixture. While glutaraldehyde is an illustrative crosslinking reagent, other crosslinking reagents may also be used or may be used in place of glutaraldehyde. Other suitable cross-linkers also may be used, as will be evident to those skilled in the art.

As noted above, in some embodiments of the invention, the analyte sensing constituent includes an agent (e.g., 3HBD or glucose oxidase) capable of producing a signal that can be sensed by the electrically conductive elements. However, other useful analyte sensing constituents can be formed from any composition that is capable of producing a detectable signal that can be sensed by the electrically conductive elements after interacting with a target analyte whose presence is to be detected. In some embodiments, the composition comprises an enzyme that modulates hydrogen peroxide concentrations upon reaction with an analyte to be sensed. Alternatively, the composition comprises an enzyme that modulates oxygen concentrations upon reaction with an analyte to be sensed. In this context, a wide variety of enzymes that either use or produce hydrogen peroxide and/or oxygen in a reaction with a physiological analyte are known in the art and these enzymes can be readily incorporated into the analyte sensing constituent composition. A variety of other enzymes known in the art can produce and/or utilize compounds whose modulation can be detected by electrically conductive elements such as the electrodes that are incorporated into the sensor designs described herein.

Protein Constituent

The electrochemical sensors of the invention optionally include a protein constituent disposed between the analyte sensing constituent and the analyte modulating constituent (see, e.g., element 116 in FIG. 1D). The term "protein constituent" is used herein according to art accepted terminology and refers to constituent containing a carrier protein or the like that is selected for compatibility with the analyte sensing constituent and/or the analyte modulating constituent. In typical embodiments, the protein constituent comprises an albumin such as human serum albumin. The HSA concentration may vary between about 0.5%-30% (w/v). Typically, the HSA concentration is about 1-10% w/v, and most typically is about 5% w/v. In alternative embodiments of the invention, collagen or BSA or other structural proteins used in these contexts can be used instead of or in addition to HSA. This constituent is typically crosslinked on the analyte sensing constituent according to art accepted protocols.

Adhesion Promoting Constituent

The electrochemical sensors of the invention can include one or more adhesion promoting (AP) constituents (see, e.g., element 114 in FIG. 1D). The term "adhesion promoting constituent" is used herein according to art accepted terminology and refers to a constituent that includes materials selected for their ability to promote adhesion between adjoining constituents in the sensor. Typically, the adhesion promoting constituent is disposed between the analyte sensing constituent and the analyte modulating constituent. Typically, the adhesion promoting constituent is disposed between the optional protein constituent and the analyte modulating constituent. The adhesion promoter constituent can be made from any one of a wide variety of materials known in the art to facilitate the bonding between such constituents and can be applied by any one of a wide variety of methods known in the art. Typically, the adhesion promoter constituent comprises a silane compound such as γ-aminopropyltrimethoxysilane.

High-Density Amine Constituent

The electrochemical sensors of the invention can include one or more high-density amine constituent layers (see, e.g., FIG. 1E) that provide the sensors with a number of beneficial functions. Such layers can optimize sensor function, for example by acting as an adhesion promoting constituent for layers adjacent to the HDA layer, by decreasing fluctuations that can occur in glucose sensors by improving sensor initialization profiles and the like. Typically, the high-density amine constituent is disposed between and in direct contact with the analyte sensing constituent and the analyte modulating constituent. In typical embodiments, the high-density amine layer comprises poly-1-lysine having molecular weights between 30 KDa and 300 KDa (e.g., between 150 KDa and 300 KDa). The concentrations of poly-1-lysine in such high-density amine layers is typically from 0.1 weight-to-weight percent to 0.5 weight-to-weight percent and the high-density amine layer is from 0.1 to 0.4 microns thick.

Analyte Modulating Constituent

The electrochemical sensors of the invention include an analyte modulating constituent (typically a glucose limiting membrane "GLM") disposed on the sensor (see, e.g., element 112 in FIG. 1D). The term "analyte modulating constituent" is used herein according to art accepted terminology and refers to a constituent that typically forms a membrane on the sensor that operates to modulate the diffusion of one or more analytes, such as glucose, through the constituent. In certain embodiments of the invention, the analyte modulating constituent is an analyte-limiting membrane which operates to prevent or restrict the diffusion of one or more analytes, such as glucose, through the constituents. In other embodiments of the invention, the analyte-modulating constituent operates to facilitate the diffusion of one or more analytes, through the constituents. Optionally such analyte modulating constituents can be formed to inhibit or restrict the diffusion of one type of molecule through the constituent (e.g., glucose), while at the same time allowing or even facilitating the diffusion of other types of molecules through the constituent (e.g., $O_2$). In illustrative embodiments of the invention, this is a 3-hydroxybutyrate modulating layer that comprises a cellulose acetate polymer, a poly-2-hydroxyethyl methacrylate polymer, a polyurethane/polyurea polymer, a branched acrylate polymer or the like. In certain embodiments of the invention, the analyte modulating layer or another layer of material in the stack of sensor layers functions as a barrier layer that inhibits the diffusion of nicotinamide adenine dinucleotide (or a mediator) out of the sensor.

With respect to glucose sensors, in known enzyme electrodes, glucose and oxygen from blood, as well as some interferants, such as ascorbic acid and uric acid, diffuse through a primary membrane of the sensor. As the glucose, oxygen and interferants reach the analyte sensing constituent, an enzyme, such as glucose oxidase, catalyzes the conversion of glucose to hydrogen peroxide and gluconolactone. The hydrogen peroxide may diffuse back through the analyte modulating constituent, or it may diffuse to an electrode where it can be reacted to form oxygen and a proton to produce a current that is proportional to the glucose concentration. The analyte modulating sensor membrane assembly serves several functions, including selectively allowing the passage of glucose therethrough (see, e.g., U.S. Patent Application No. 2011-0152654).

Cover Constituent

The electrochemical sensors of the invention can include one or more cover constituents, which are typically electrically insulating protective constituents (see, e.g., element 106 in FIG. 1D). Typically, such cover constituents can be in the form of a coating, sheath or tube and are disposed on at least a portion of the analyte modulating constituent. Acceptable polymer coatings for use as the insulating protective cover constituent can include, but are not limited to, non-toxic biocompatible polymers such as silicone compounds, polyimides, biocompatible solder masks, epoxy acrylate copolymers, or the like. Further, these coatings can be photo-imageable to facilitate photolithographic forming of apertures through to the conductive constituent. A typical cover constituent comprises spun on silicone. As is known in the art, this constituent can be a commercially available RTV (room temperature vulcanized) silicone composition. A typical chemistry in this context is polydimethyl siloxane (acetoxy based).

C. Typical Analyte Sensor System Embodiments of the Invention

Embodiments of the sensor elements and sensors can be operatively coupled to a variety of other system elements typically used with analyte sensors (e.g., structural elements such as piercing members, insertion sets and the like as well as electronic components such as processors, monitors, medication infusion pumps and the like), for example to adapt them for use in various contexts (e.g., implantation within a mammal). One embodiment of the invention includes a method of monitoring a physiological characteristic of a user using an embodiment of the invention that includes an input element capable of receiving a signal from a sensor that is based on a sensed physiological characteristic value of the user, and a processor for analyzing the received signal. In typical embodiments of the invention, the processor determines a dynamic behavior of the physiological characteristic value and provides an observable indicator based upon the dynamic behavior of the physiological characteristic value so determined. In some embodiments, the physiological characteristic value is a measure of the concentration of blood glucose in the user. In other embodiments, the process of analyzing the received signal and determining a dynamic behavior includes repeatedly measuring the physiological characteristic value to obtain a series of physiological characteristic values in order to, for example, incorporate comparative redundancies into a sensor apparatus in a manner designed to provide confirmatory information on sensor function, analyte concentration measurements, the presence of interferences and the like.

Embodiments of the invention include devices which process display data from measurements of a sensed physiological characteristic (e.g., blood glucose concentrations) in a manner and format tailored to allow a user of the device to easily monitor and, if necessary, modulate the physiological status of that characteristic (e.g., modulation of blood glucose concentrations via insulin administration). An illustrative embodiment of the invention is a device comprising a sensor input capable of receiving a signal from a sensor, the signal being based on a sensed physiological characteristic value of a user; a memory for storing a plurality of measurements of the sensed physiological characteristic value of the user from the received signal from the sensor; and a display for presenting a text and/or graphical representation of the plurality of measurements of the sensed physiological characteristic value (e.g. text, a line graph or the like, a bar graph or the like, a grid pattern or the like or a combination thereof). Typically, the graphical representation displays real time measurements of the sensed physiological characteristic value. Such devices can be used in a variety of contexts, for example in combination with other medical apparatuses. In some embodiments of the invention, the device is used in combination with at least one other medical device (e.g., a glucose sensor).

An illustrative system embodiment consists of a glucose sensor, a transmitter and pump receiver and a glucose meter. In this system, radio signals from the transmitter can be sent to the pump receiver every 5 minutes to provide providing real-time sensor glucose (SG) values. Values/graphs are displayed on a monitor of the pump receiver so that a user can self monitor blood glucose and deliver insulin using their own insulin pump. Typically, an embodiment of device disclosed herein communicates with a second medical device via a wired or wireless connection. Wireless communication can include for example the reception of emitted radiation signals as occurs with the transmission of signals via RF telemetry, infrared transmissions, optical transmission, sonic and ultrasonic transmissions and the like. Optionally, the device is an integral part of a medication infusion pump (e.g., an insulin pump). Typically, in such devices, the physiological characteristic values include a plurality of measurements of blood glucose.

Figure 3:
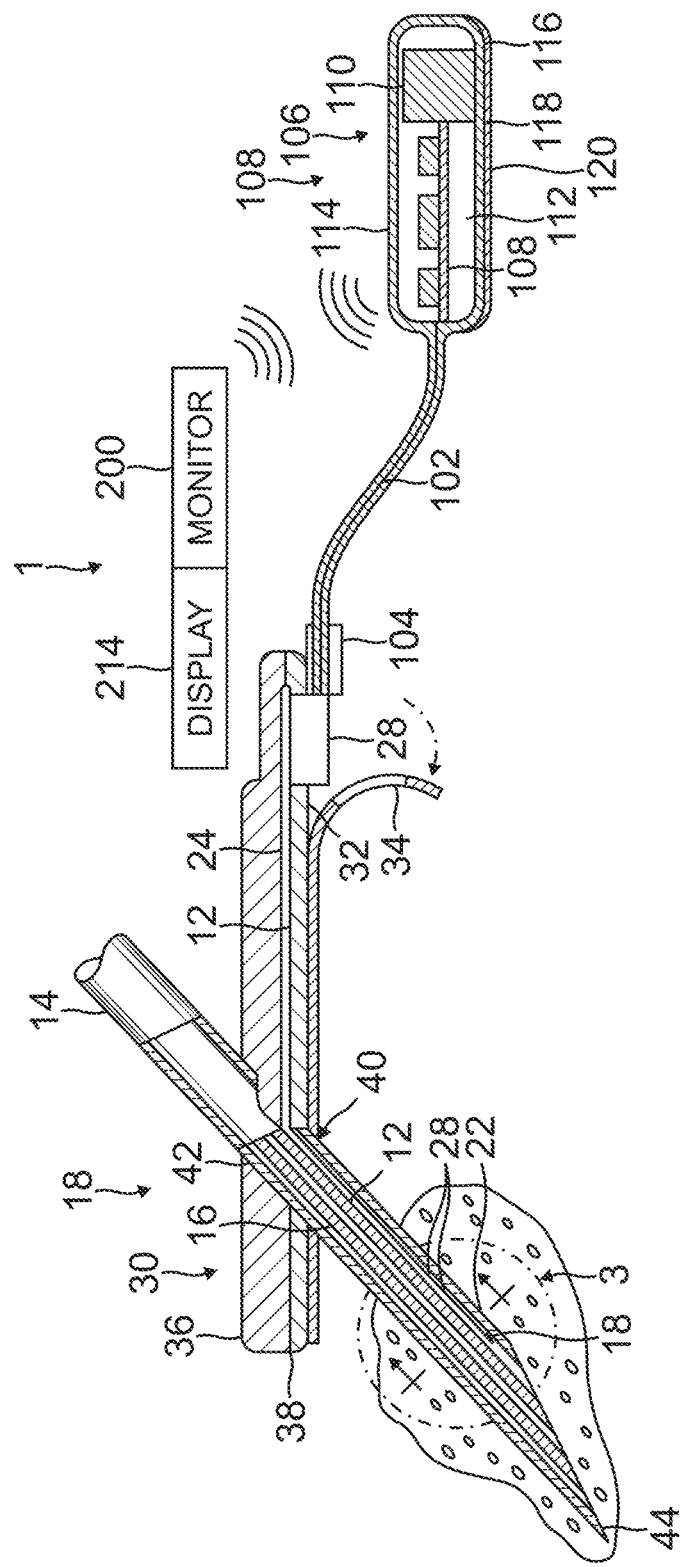
FIG. 3 provides a perspective view illustrating a subcutaneous sensor insertion set, a telemetered characteristic monitor transmitter device, and a data receiving device embodying features of the invention.

FIG. 3 provides a perspective view of one generalized embodiment of subcutaneous sensor insertion system and a block diagram of a sensor electronics device according to one illustrative embodiment of the invention. Additional elements typically used with such sensor system embodiments are disclosed for example in U.S. Patent Application No. 20070163894, the contents of which are incorporated by reference. FIG. 3 provides a perspective view of a telemetered characteristic monitor system 1, including a subcutaneous sensor set 10 provided for subcutaneous placement of an active portion of a flexible sensor 12, or the like, at a selected site in the body of a user. The subcutaneous or percutaneous portion of the sensor set 10 includes a hollow, slotted insertion needle 14 having a sharpened tip 44, and a cannula 16. Inside the cannula 16 is a sensing portion 18 of the sensor 12 to expose one or more sensor electrodes 20 to the user's bodily fluids through a window 22 formed in the cannula 16. The sensing portion 18 is joined to a connection portion 24 that terminates in conductive contact pads, or the like, which are also exposed through one of the insulative layers. The connection portion 24 and the contact pads are generally adapted for a direct wired electrical connection to a suitable monitor 200 coupled to a display 214 for monitoring a user's condition in response to signals derived from the sensor electrodes 20. The connection portion 24 may be conveniently connected electrically to the monitor 200 or a characteristic monitor transmitter 100 by a connector block 28 (or the like).

As shown in FIG. 3, in accordance with embodiments of the present invention, subcutaneous sensor set 10 may be configured or formed to work with either a wired or a wireless characteristic monitor system. The proximal part of the sensor 12 is mounted in a mounting base 30 adapted for placement onto the skin of a user. The mounting base 30 can be a pad having an underside surface coated with a suitable pressure sensitive adhesive layer 32, with a peel-off paper strip 34 normally provided to cover and protect the adhesive layer 32, until the sensor set 10 is ready for use. The mounting base 30 includes upper and lower layers 36 and 38, with the connection portion 24 of the flexible sensor 12 being sandwiched between the layers 36 and 38. The connection portion 24 has a forward section joined to the active sensing portion 18 of the sensor 12, which is folded angularly to extend downwardly through a bore 40 formed in the lower base layer 38. Optionally, the adhesive layer 32 (or another portion of the apparatus in contact with in vivo tissue) includes an anti-inflammatory agent to reduce an inflammatory response and/or anti-bacterial agent to reduce the chance of infection. The insertion needle 14 is adapted for slide-fit reception through a needle port 42 formed in the upper base layer 36 and through the lower bore 40 in the lower base layer 38. After insertion, the insertion needle 14 is withdrawn to leave the cannula 16 with the sensing portion 18 and the sensor electrodes 20 in place at the selected insertion site. In this embodiment, the telemetered characteristic monitor transmitter 100 is coupled to a sensor set 10 by a cable 102 through a connector 104 that is electrically coupled to the connector block 28 of the connector portion 24 of the sensor set 10.

In the embodiment shown in FIG. 3, the telemetered characteristic monitor 100 includes a housing 106 that supports a printed circuit board 108, batteries 110, antenna 112, and the cable 102 with the connector 104. In some embodiments, the housing 106 is formed from an upper case 114 and a lower case 116 that are sealed with an ultrasonic weld to form a waterproof (or resistant) seal to permit cleaning by immersion (or swabbing) with water, cleaners, alcohol or the like. In some embodiments, the upper and lower case 114 and 116 are formed from a medical grade plastic. However, in alternative embodiments, the upper case 114 and lower case 116 may be connected together by other methods, such as snap fits, sealing rings, RTV (silicone sealant) and bonded together, or the like, or formed from other materials, such as metal, composites, ceramics, or the like. In other embodiments, the separate case can be eliminated, and the assembly is simply potted in epoxy or other moldable materials that is compatible with the electronics and reasonably moisture resistant. As shown, the lower case 116 may have an underside surface coated with a suitable pressure sensitive adhesive layer 118, with a peel-off paper strip 120 normally provided to cover and protect the adhesive layer 118, until the sensor set telemetered characteristic monitor transmitter 100 is ready for use.

In the illustrative embodiment shown in FIG. 3, the subcutaneous sensor set 10 facilitates accurate placement of a flexible thin film electrochemical sensor 12 of the type used for monitoring specific blood parameters representative of a user's condition. The sensor 12 monitors glucose levels in the body and may be used in conjunction with automated or semi-automated medication infusion pumps of the external or implantable type as described in U.S. Pat. Nos. 4,562,751; 4,678,408; 4,685,903 or 4,573,994, to control delivery of insulin to a diabetic patient.

In the illustrative embodiment shown in FIG. 3, the sensor electrodes 10 may be used in a variety of sensing applications and may be configured in a variety of ways. For example, the sensor electrodes 10 may be used in physiological parameter sensing applications in which some type of biomolecule is used as a catalytic agent. For example, the sensor electrodes 10 may be used in a glucose and oxygen sensor having a glucose oxidase enzyme catalyzing a reaction with the sensor electrodes 20. The sensor electrodes 10, along with a biomolecule or some other catalytic agent, may be placed in a human body in a vascular or non-vascular environment. For example, the sensor electrodes 20 and biomolecule may be placed in a vein and be subjected to a blood stream or may be placed in a subcutaneous or peritoneal region of the human body.

In the embodiment of the invention shown in FIG. 3, the monitor of sensor signals 200 may also be referred to as a sensor electronics device 200. The monitor 200 may include a power source, a sensor interface, processing electronics (i.e., a processor), and data formatting electronics. The monitor 200 may be coupled to the sensor set 10 by a cable 102 through a connector that is electrically coupled to the connector block 28 of the connection portion 24. In an alternative embodiment, the cable may be omitted. In this embodiment of the invention, the monitor 200 may include an appropriate connector for direct connection to the connection portion 104 of the sensor set 10. The sensor set 10 may be modified to have the connector portion 104 positioned at a different location, e.g., on top of the sensor set to facilitate placement of the monitor 200 over the sensor set.

While the analyte sensor and sensor systems disclosed herein are typically designed to be implantable within the body of a mammal, the inventions disclosed herein are not limited to any particular environment and can instead be used in a wide variety of contexts, for example for the analysis of most in vivo and in vitro liquid samples including biological fluids such as interstitial fluids, whole-blood, lymph, plasma, serum, saliva, urine, stool, perspiration, mucus, tears, cerebrospinal fluid, nasal secretion, cervical or vaginal secretion, semen, pleural fluid, amniotic fluid, peritoneal fluid, middle ear fluid, joint fluid, gastric aspirate or the like. In addition, solid or desiccated samples may be dissolved in an appropriate solvent to provide a liquid mixture suitable for analysis.

It is to be understood that this invention is not limited to the particular embodiments described, as such may, of course, vary. It is also to be understood that the terminology used herein is for the purpose of describing particular embodiments only, and is not intended to be limiting, since the scope of the present invention will be limited only by the appended claims. In the description of the preferred embodiment, reference is made to the accompanying drawings which form a part hereof, and in which is shown by way of illustration a specific embodiment in which the invention may be practiced. It is to be understood that other embodiments may be utilized, and structural changes may be made without departing from the scope of the present invention.

A. Ketone Permselective Membrane Embodiments

|  | 2XGLM | 0.4XPCU-GLM | Cellulose Acetate | PEVA | 1/30XGLM |
|---|---|---|---|---|---|
| 3HB permeability | 5.28E−09 | 3.41E−08 | 1.77E−10 | 1.52E−09 | 8.43E−09 |
| NAD permeability | 2.15E−09 | 1.15E−09 | 1.00E−12 | 1.80E−11 | 3.45E−10 |
| $P_{3HB}/P_{NADH}$ | 2.46 | 30 | 177 | 84 | 24.4 |

■ No single membrane can meet both high 3HB acid permeability and extremely low NAD permeability properties.

B. Example Embodiments of Dual Layer Membrane Approach

|  | Case 1 PCU-GLM+ PEVA | Case 2 PCU-GLM + PEVA | Case 3 PEVA | Case 4 PCU-GLM + CA |
|---|---|---|---|---|
| Thickness of L1 membrane (um) | 40 | 25 |  | 35 |
| Thickness of L2 membrane (um) | 5 | 20 | 45 | 10 |
| NAD Permeability of L1 (cm2/sec) | 1.15E−09 | 1.15E−09 |  | 1.15E−09 |
| NAD Permeability of L2 (cm2/sec) | 1.80E−11 | 1.80E−11 | 1.80E−11 | 1.00E−12* |
| Total thickness (um) | 45 | 45 | 45 | 45 |
| Overall NAD Permeability of (L1 + L2) | 1.44E−10 | 3.97E−11 | 1.80E−11 | 4.49E−12 |
| Thickness of L1 membrane (um) | 40 | 25 |  | 35 |
| Thickness of L2 membrane (um) | 5 | 20 | 45 | 10 |
| 3HB Permeability of L1 | 3.41E−08 | 3.41E−08 |  | 3.41E−08 |
| 3HB Permeability of L2 | 1.52E−09 | 1.52E−09 | 1.52E−09 | 1.77E−10 |
| Total thickness | 45 | 45 | 45 | 45 |
| Overall 3HB Permeability of (L1 + L2) | 1.01E−08 | 3.24E−09 | 1.52E−09 | 7.82E−10 |
| P(3HB)/ P(NAD) ratio | 70 | 82 | 84 | 1701 |
| 0.005 mg NAD last (hours) | 9 | 31 | 69 | 279 |

The invention claimed is:

1. A D-3-hydroxybutyrate analyte sensor comprising a ketone limiting membrane, wherein the ketone limiting membrane comprises:
   (a) an inner membrane layer having a first permeability to D-3-hydroxybutyrate and a first permeability to nicotinamide adenine dinucleotide; and
   (b) an outer membrane layer having a second permeability to D-3-hydroxybutyrate and a second permeability to nicotinamide adenine dinucleotide; wherein:
   the inner membrane layer permeability to nicotinamide adenine dinucleotide is lower than the outer membrane layer permeability to nicotinamide adenine dinucleotide; and
   the D-3-hydroxybutyrate analyte sensor further comprises:
   a 3-hydroxybutyrate sensing electrode comprising:
   a layer of an electroactive material;
   an enzyme layer comprising 3-hydroxybutyrate dehydrogenase enzyme in operable contact with the electroactive material;
   a nicotinamide adenine dinucleotide in operable contact with the 3-hydroxybutyrate dehydrogenase enzyme; and
   a mediator in operable contact with the nicotinamide adenine dinucleotide.

2. The D-3-hydroxybutyrate analyte sensor of claim 1, wherein:
   (a) the inner membrane exhibits a perm-selectivity of 3-hydroxybutyric acid to nicotinamide adenine dinucleotide (NAD)+hydrogen (H) of at least 50; and/or
   (b) the outer membrane exhibits a perm-selectivity of 3-hydroxybutyric acid to nicotinamide adenine dinucleotide (NAD)+hydrogen (H) of at least 1.

3. The D-3-hydroxybutyrate analyte sensor of claim 1, wherein:
   (a) the inner membrane exhibits a 3-hydroxybutyrate permeability of at least 1.0E−09 cm2/sec;
   (b) the inner membrane exhibits a nicotinamide adenine dinucleotide (NAD)+hydrogen (H) permeability not greater than 3.0E−09 cm2/sec;
   (c) the outer membrane exhibits a 3-hydroxybutyrate permeability of at least 5.0E−09 cm2/sec; and/or (d) the outer membrane exhibits a nicotinamide adenine dinucleotide (NAD)+hydrogen (H) permeability not greater than 5.0E-09 cm2/sec.

4. The D-3-hydroxybutyrate analyte sensor of claim 1, wherein:
(a) the inner membrane layer is from 0.1 to 5 microns in thickness, and/or
(b) the outer layer is from 2 to 50 microns in thickness.

5. The D-3-hydroxybutyrate analyte sensor of claim 1, wherein:
(a) the inner membrane layer comprises cellulose acetate; and
(b) the outer membrane layer comprises a polyurea, a a nine-membered polypropylene glycol compound terminated by an amino group at a first end and a methoxyethyl termination at a second end, a polydimethylsiloxane, and/or 4,4'-Methylenebis (cyclohexyl isocyanate).

6. The D-3-hydroxybutyrate analyte sensor of claim 1, wherein:
(a) the inner membrane layer comprises cellulose acetate; and
(b) the outer membrane layer comprises a polyurea-urethane or a polycarbonate-urethane composition containing a nine-membered polypropylene glycol compound terminated by an amino group at a first end and a methoxyethyl termination at a second end, polydimethylsiloxane, 4,4'-Methylenebis (cyclohexyl isocyanate), 4,4'-Methylenebis (phenyl isocyanate), and polycarbonate diol.

7. A method of estimating the concentrations of 3-hydroxybutyrate in vivo, the method comprising:
disposing a D-3-hydroxybutyrate analyte sensor of claim 1 into an in vivo environment of a subject, wherein the environment comprises 3-hydroxybutyrate; and
estimating the concentration of 3-hydroxybutyrate;
so that the concentrations of 3-hydroxybutyrate in vivo are estimated.

8. A method of making a D-3-hydroxybutyrate analyte sensor comprising a ketone limiting membrane, the method:
(a) forming an inner membrane layer of the ketone limiting membrane from materials selected to exhibit a first permeability to D-3-hydroxybutyrate and a first permeability to nicotinamide adenine dinucleotide; and
(b) forming an outer membrane layer of the ketone limiting membrane from materials selected to exhibit a second permeability to D-3-hydroxybutyrate and a second permeability to nicotinamide adenine dinucleotide; wherein:
the inner membrane layer permeability to nicotinamide adenine dinucleotide is lower than the outer membrane layer permeability to nicotinamide adenine dinucleotide; and
disposing the ketone limiting membrane on a D-3-hydroxybutyrate analyte sensor at a location selected so that D-3-hydroxybutyrate diffuses from an external environment through the ketone limiting membrane and to an electrode disposed within the D-3-hydroxybutyrate analyte sensor, wherein:
the electrode is coupled to a ketone sensing complex; and
the electrode is formed to comprise:
a layer of an electroactive material;
an enzyme layer comprising 3-hydroxybutyrate dehydrogenase enzyme in operable contact with the electroactive material;
nicotinamide adenine dinucleotide in operable contact with the 3-hydroxybutyrate dehydrogenase enzyme; and
a mediator in operable contact with the nicotinamide adenine dinucleotide.

9. The method of claim 8, wherein:
(a) the inner membrane is formed to exhibit a permselectivity of 3-hydroxybutyric acid to nicotinamide adenine dinucleotide (NAD)+hydrogen (H) of at least 50; and/or
(b) the outer membrane is formed to exhibit a permselectivity of 3-hydroxybutyric acid to nicotinamide adenine dinucleotide (NAD)+hydrogen (H) of at least 1.

10. The method of claim 8, wherein:
(a) the inner membrane is formed to exhibit a 3-hydroxybutyrate permeability of at least 1.0E-09 cm2/sec;
(b) the inner membrane is formed to exhibit a nicotinamide adenine dinucleotide (NAD)+hydrogen (H) permeability not greater than 3.0E-09 cm2/sec;
(c) the outer membrane is formed to exhibit a 3-hydroxybutyrate permeability of at least 5.0E-09 cm2/sec; and/or
(d) the outer membrane is formed to exhibit a nicotinamide adenine dinucleotide (NAD)+hydrogen (H) permeability not greater than 5.0E-09 cm2/sec.

11. The method of claim 8, wherein:
(a) the inner membrane layer is formed to be from 0.1 to 5 microns in thickness, and/or
(b) the outer layer is formed to be from 2 to 50 microns in thickness.

12. A D-3-hydroxybutyrate analyte sensor comprising a mediator and a ketone limiting membrane, wherein the ketone limiting membrane comprises:
an inner membrane layer having a first permeability to D-3-hydroxybutyrate and a first permeability to nicotinamide adenine dinucleotide; and
an outer membrane layer having a second permeability to D-3-hydroxybutyrate and a second permeability to nicotinamide adenine dinucleotide; wherein:
the inner membrane layer permeability to nicotinamide adenine dinucleotide is lower than the outer membrane layer permeability to nicotinamide adenine dinucleotide.

13. A D-3-hydroxybutyrate analyte sensor comprising a ketone limiting membrane, wherein the ketone limiting membrane comprises:
an inner membrane layer having a first permeability to D-3-hydroxybutyrate and a first permeability to nicotinamide adenine dinucleotide; and
an outer membrane layer having a second permeability to D-3-hydroxybutyrate and a second permeability to nicotinamide adenine dinucleotide; wherein:
the inner membrane layer permeability to nicotinamide adenine dinucleotide is lower than the outer membrane layer permeability to nicotinamide adenine dinucleotide;
the inner membrane layer comprises poly (ethylene-vinyl acetate), and
the outer membrane layer comprises polyurea, a nine-membered polypropylene glycol compound terminated by an amino group at a first end and a methoxyethyl termination at a second end, polydimethylsiloxane, and 4,4'-Methylenebis (cyclohexyl isocyanate).

14. A D-3-hydroxybutyrate analyte sensor comprising a ketone limiting membrane, wherein the ketone limiting membrane comprises:

an inner membrane layer having a first permeability to D-3-hydroxybutyrate and a first permeability to nicotinamide adenine dinucleotide; and an outer membrane layer having a second permeability to D-3-hydroxybutyrate and a second permeability to nicotinamide adenine dinucleotide; wherein:

the inner membrane layer permeability to nicotinamide adenine dinucleotide is lower than the outer membrane layer permeability to nicotinamide adenine dinucleotide;

the inner membrane layer comprises poly (ethylene-vinyl acetate), and the outer membrane layer comprises polyurea-urethane containing a nine-membered polypropylene glycol compound terminated by an amino group at a first end and a methoxyethyl termination at a second end, polydimethylsiloxane, 4,4'-Methylenebis (cyclohexyl isocyanate), 4,4'-Methylenebis (phenyl isocyanate), and polycarbonate diol.

* * * * *